(12) United States Patent
Guo et al.

(10) Patent No.: US 11,158,086 B2
(45) Date of Patent: Oct. 26, 2021

(54) CAMERA CALIBRATION METHOD AND APPARATUS, ELECTRONIC DEVICE, AND COMPUTER-READABLE STORAGE MEDIUM

(71) Applicant: GUANGDONG OPPO MOBILE TELECOMMUNICATIONS CORP., LTD., Guangdong (CN)

(72) Inventors: Ziqing Guo, Dongguan (CN); Haitao Zhou, Dongguan (CN); Kamwing Au, Dongguan (CN); Xiao Tan, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 70 days.

(21) Appl. No.: 16/524,678

(22) Filed: Jul. 29, 2019

(65) Prior Publication Data
US 2020/0043198 A1 Feb. 6, 2020

(30) Foreign Application Priority Data

Aug. 1, 2018 (CN) .......................... 201810866119.5
Aug. 1, 2018 (CN) .......................... 201810867079.6

(51) Int. Cl.
*G06T 7/80* (2017.01)
*G06T 7/33* (2017.01)
*G06T 7/00* (2017.01)

(52) U.S. Cl.
CPC .................. *G06T 7/80* (2017.01); *G06T 7/33* (2017.01); *G06T 7/97* (2017.01); *G06T 2207/10024* (2013.01); *G06T 2207/10048* (2013.01)

(58) Field of Classification Search
CPC .... G06T 7/80; G06T 7/33; G06T 7/97; G06T 2207/10048; G06T 2207/10024
See application file for complete search history.

(56) References Cited

U.S. PATENT DOCUMENTS 7,212,228 B2  5/2007 Utsumi
2002/0163582 A1* 11/2002 Gruber .................. G01C 11/02
                                          348/218.1

(Continued)

FOREIGN PATENT DOCUMENTS

CN  102782721 A  11/2012
CN  105701827 A   6/2016

(Continued)

OTHER PUBLICATIONS

International Search Report dated May 27, 2019; PCT/CN2019/075375.

(Continued)

*Primary Examiner* — Kim Y Vu
*Assistant Examiner* — Molly Delaney

(57) ABSTRACT

A camera calibration method, a camera calibration apparatus (300), an electronic device and a computer-readable storage medium are provided. The camera calibration method includes the following steps. At (202), a target infrared image and a Red/Green/Blue (RGB) image obtained by capturing the same scene by an infrared camera and an RGB camera are acquired when the image definition is lower than a definition threshold. At (204), feature points in the target infrared image are extracted to obtain a first feature point set, feature points in the RGB image are extracted to obtain a second feature point set, and the first feature point set and the second feature point set are subjected to matching. At (206), a transformation relation between a coordinate system of the (Continued)

infrared camera and a coordinate system of the RGB camera is acquired according to the matched feature points.

17 Claims, 4 Drawing Sheets

(56) References Cited

U.S. PATENT DOCUMENTS

| | | | |
|---|---|---|---|
| 2003/0156189 | A1 | 8/2003 | Utsumi |
| 2011/0157373 | A1 | 6/2011 | Ye |
| 2014/0348416 | A1 | 11/2014 | Lee |
| 2015/0350618 | A1 | 12/2015 | Meier et al. |
| 2017/0011524 | A1* | 1/2017 | Shpunt .................. G01B 11/22 |
| 2017/0064287 | A1* | 3/2017 | Borisov ................. G06T 17/00 |
| 2017/0155896 | A1* | 6/2017 | Malaescu ........... H04N 5/23212 |
| 2018/0115705 | A1* | 4/2018 | Olsson ...................... G06T 5/50 |
| 2018/0173949 | A1* | 6/2018 | Jeong ................ G06K 9/00255 |
| 2018/0315213 | A1* | 11/2018 | Surazhsky ............... G06T 7/55 |
| 2018/0336704 | A1* | 11/2018 | Javan Roshtkhari ..... G06T 7/62 |
| 2019/0000564 | A1* | 1/2019 | Navab .................... G06T 7/521 |
| 2019/0043220 | A1* | 2/2019 | Kumar ............. H04N 5/232945 |
| 2019/0132584 | A1* | 5/2019 | Yu ....................... H04N 17/002 |
| 2019/0307365 | A1* | 10/2019 | Addison ............ A61B 5/14551 |

FOREIGN PATENT DOCUMENTS

| | | | |
|---|---|---|---|
| CN | 106340045 | A | 1/2017 |
| CN | 107679481 | A | 2/2018 |
| CN | 107820011 | A | 3/2018 |
| CN | 108090477 | A | 5/2018 |
| CN | 108230395 | A | 6/2018 |
| CN | 109040745 | A | 12/2018 |
| CN | 109040746 | A | 12/2018 |
| TW | 201349870 | A | 12/2013 |

OTHER PUBLICATIONS

Written Opinion of the International Search Authority dated May 27, 2019; PCT/CN2019/075375.
Yuhua Zou et al: "Indoor localization and 3D scene reconstruction for mobile robots using the Microsoft Kinect sensor", Industrial Informatics(INDIN), 2012 10th IEEE International Conference on, IEEE, Jul. 25, 2012(Jul. 25, 2012), pp. 1182-1187, XP032235334.
First Office Action of the Taiwanese application No. 108120211, dated Feb. 15, 2020.
European Search Report in the European application No. 19178034.5, dated Jan. 14, 2020.
Office Action of the Indian application No. 201914030545, dated Jul. 5, 2021.

* cited by examiner

CAMERA CALIBRATION METHOD AND APPARATUS, ELECTRONIC DEVICE, AND COMPUTER-READABLE STORAGE MEDIUM

CROSS-REFERENCE TO RELATED APPLICATIONS

The present application claims benefit of Patent Application Nos. 201810867079.6 and No. 201810866119.5, filed to the State Intellectual Property Office of China on Aug. 1, 2018, the contents of which are hereby incorporated by reference in their entirety.

BACKGROUND

With the development of electronic devices and imaging technology, more and more users use cameras of electronic devices to capture images. An infrared camera and a Red/Green/Blue (RGB) camera need to be subjected to parameter calibration before leaving the factory. When the temperature changes or an electronic device falls, a camera module may be deformed, which affects the definition of a captured image.

SUMMARY

The present application relates to the field of imaging technology, and in particular to a camera calibration method and apparatus, an electronic device, and a computer-readable storage medium.

Embodiments of the present application provide a camera calibration method, a camera calibration apparatus, an electronic device and a computer-readable storage medium, capable of improving the definition of a captured image.

The camera calibration method may include that: a target infrared image and an RGB image obtained by capturing the same scene by an infrared camera and an RGB camera are acquired responsive to that an image definition is lower than a definition threshold; feature points in the target infrared image are extracted to obtain a first feature point set, feature points in the RGB image are extracted to obtain a second feature point set, and the first feature point set and the second feature point set are subjected to matching; and a transformation relation between a coordinate system of the infrared camera and a coordinate system of the RGB camera is acquired according to matched feature points.

A camera calibration apparatus may include an image acquisition module, a matching module and a parameter determination module. The image acquisition module may be configured to acquire a target infrared image and an RGB image obtained by capturing the same scene by an infrared camera and an RGB camera responsive to that an image definition is lower than a definition threshold. The matching module may be configured to extract feature points from the target infrared image to obtain a first feature point set, extract feature points from the RGB image to obtain a second feature point set, and match the first feature point set with the second feature point set. The parameter determination module may be configured to acquire a transformation relation between a coordinate system of the infrared camera and a coordinate system of the RGB camera according to the matched feature points.

An electronic device may include a memory and a processor. The memory may store a computer program. When the computer program is executed by the processor, the processor may be enabled to perform the steps that: a target infrared image and an RGB image obtained by capturing the same scene by an infrared camera and an RGB camera are acquired responsive to that an image definition is lower than a definition threshold; feature points in the target infrared image are extracted to obtain a first feature point set, feature points in the RGB image are extracted to obtain a second feature point set, and the first feature point set and the second feature point set are subjected to matching; and a transformation relation between a coordinate system of the infrared camera and a coordinate system of the RGB camera is acquired according to matched feature points.

A non-volatile computer-readable storage medium may store a computer program. When the computer program is executed by a processor, the following steps may be implemented: a target infrared image and an RGB image obtained by capturing the same scene by an infrared camera and an RGB camera are acquired responsive to that an image definition is lower than a definition threshold; feature points in the target infrared image are extracted to obtain a first feature point set, feature points in the RGB image are extracted to obtain a second feature point set, and the first feature point set and the second feature point set are subjected to matching; and a transformation relation between a coordinate system of the infrared camera and a coordinate system of the RGB camera is acquired according to matched feature points.

BRIEF DESCRIPTION OF DRAWINGS

In order to describe the technical solutions in the embodiments of the present application more clearly, the drawings used in descriptions about the embodiments or the conventional art will be simply introduced below. The drawings in the following descriptions illustrate some embodiments of the present application only. Those of ordinary skilled in the art may further obtain other drawings according to these drawings without creative work.

DETAILED DESCRIPTION

In order to make the objectives, technical solutions and advantages of the present application clearer, the present application will be further elaborated below in conjunction with the drawings and the embodiments. It will be appreciated that specific embodiments described here are only used to explain the present application, not to limit the present application.

It will be understood that the terms "first", "second" and the like, as used here, may be used to describe various elements, but these elements are not limited by these terms. These terms are only used to distinguish one element from another. For example, a first calibration image may be called a second calibration image without departing from the scope of the present application, and similarly, a second calibration image may be called a first calibration image. Both the first calibration image and the second calibration image are calibration images, but they are not the same calibration image.

Figure 1:
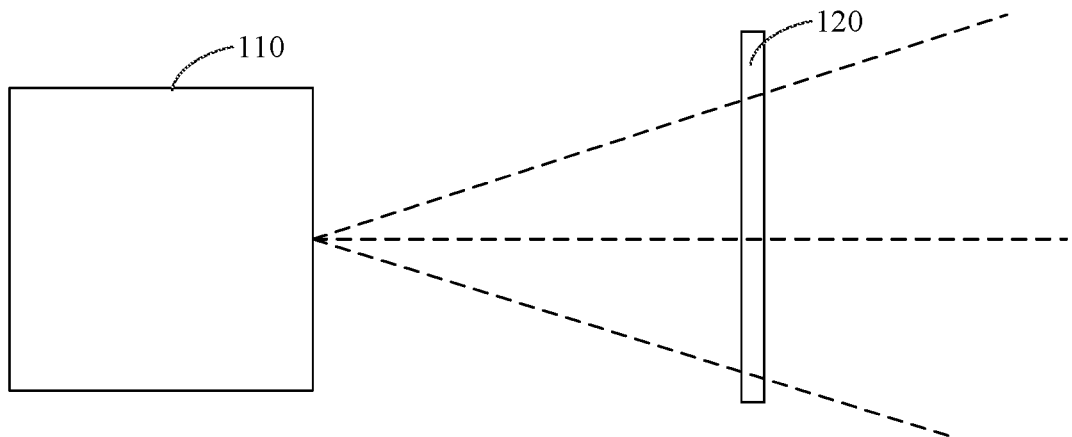
FIG. 1 schematically shows an application environment diagram of a camera calibration method according to some embodiments of the present application.

FIG. 1 schematically shows an application environment diagram of a camera calibration method in one embodiment. As shown in FIG. 1, the application environment includes an electronic device 110 and a scene 120. The electronic device 110 includes an infrared camera and an RGB camera. The electronic device 110 may obtain a target infrared image and an RGB image by capturing a scene 120 by the infrared camera and the RGB camera, perform feature point matching according to the target infrared image and the RGB image, and then calculate a transformation relation between a coordinate system of the infrared camera and a coordinate system of the RGB camera. The electronic device 110 may be a smart phone, a tablet, a personal digital assistant, a wearable device, or the like.

Figure 2:
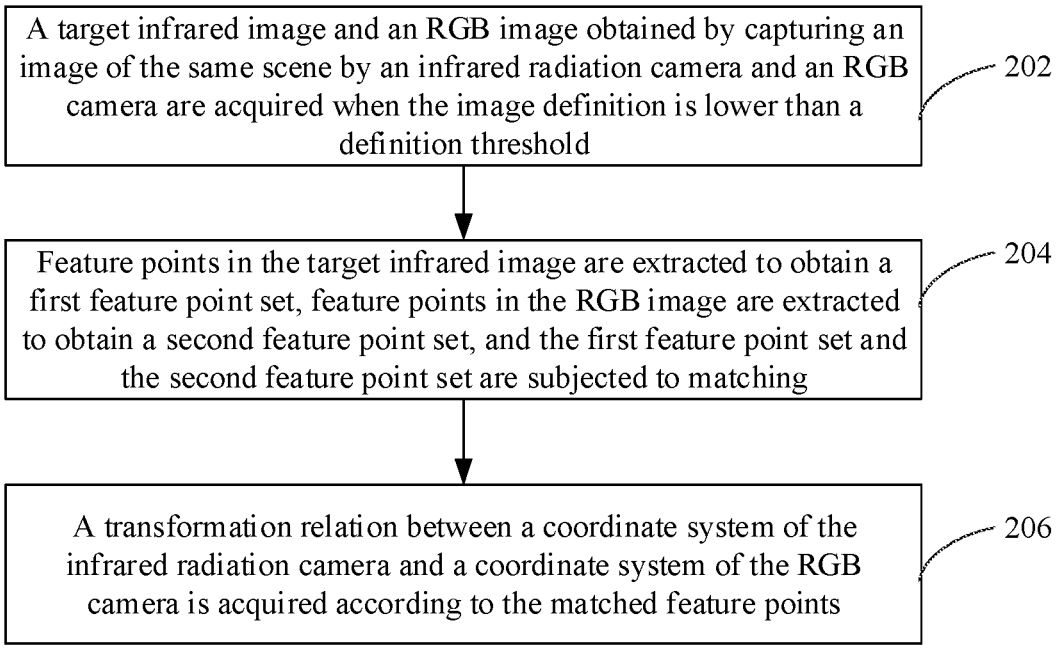
FIG. 2 and FIG. 3 show a flowchart of a camera calibration method according to some embodiments of the present application.

FIG. 2 shows a flowchart of a camera calibration method in an embodiment. As shown in FIG. 2, the camera calibration method may include the steps as follows.

At step 202, a target infrared image and an RGB image obtained by capturing the same scene by an infrared camera and an RGB camera are acquired responsive to that the image definition is lower than a definition threshold.

Specifically, the electronic device 110 may periodically detect an image captured by the camera itself, and it is indicated that the camera needs to be calibrated responsive to that an image definition is lower than a definition threshold. The definition threshold may be set as required, such as 80% and 90%. A Brenner gradient function may be used to calculate a square of a gray difference between two adjacent pixels to obtain the image definition. Also, a sobel operator of a Tenegrad gradient function may be used to extract horizontal and vertical gradient values respectively, so that the image definition may be obtained based on the image definition of the Tenengrad gradient function. A variance function, an energy gradient function, a vollath function, an entropy function, an EAV point sharpness algorithm function, a Laplacian gradient function, an SMD gray variance function, and the like may also be used to detect the image definition.

At step 204, feature points in the target infrared image are extracted to obtain a first feature point set, feature points in the RGB image are extracted to obtain a second feature point set, and the first feature point set and the second feature point set are subjected to matching.

Specifically, a first feature point set is obtained by performing Scale-Invariant Feature Transform (SIFT) detection on the target infrared image, and a second feature point set is obtained by performing SIFT detection on the RGB image. SIFT is a description used in image processing. This description has scale invariance and may detect key points in an image. The feature points in the first feature point set and the second feature point set are subjected to matching by SIFT.

SIFT feature detection may include: searching image positions on all scales; determining a position and a scale by fitting at each candidate position; assigning one or more directions to each key point position based on the local gradient direction of the image; and measuring the local gradient of the image at the selected scale within the area around each key point.

SIFT feature matching may include: extracting feature vectors independent of scaling, rotation and brightness change from multiple images to obtain SIFT feature vectors; and using a Euclidean distance of the SIFT feature vectors to determine the similarity of key points in two images. The smaller the Euclidean distance is, the higher the similarity is. When the Euclidean distance is lower than a preset threshold, it can be determined that the matching is successful.

At step 206, a transformation relation between a coordinate system of the infrared camera and a coordinate system of the RGB camera is acquired according to the matched feature points.

It is assumed that $P_{ir}$ is a space coordinate of a point in the coordinate of the infrared camera, $p_{ir}$ is a projection coordinate (x and y are in pixels, and z is a depth value in millimeters) of this point on an image plane, and $H_{ir}$ is an internal reference matrix of a depth camera. A pinhole imaging model shows that they satisfy the following relationships:

$$p_{ir}=H_{ir}P_{ir}$$

$$P_{ir}=H_{ir}^{-1}p_{ir} \quad \text{Formula (1)}$$

It is further assumed that $P_{rgb}$ is a space coordinate of the same point in the coordinate of the RGB camera, $p_{rgb}$ is a projection coordinate of this point on an RGB image plane, and $H_{rgb}$ is an internal reference matrix of the RGB camera. Since the coordinates of the infrared camera and the RGB camera are different, they may be linked by a rotation translation transformation, namely:

$$P_{rgb}=RP_{ir}+T \quad \text{Formula (2)}$$

where R is a rotation matrix, and T is a translation vector. $P_{rgb}$ is projected by $H_{rgb}$ to obtain an RGB coordinate corresponding to this point.

$$p_{rgb}=H_{rgb}P_{rgb} \quad \text{Formula (3)}$$

It is to be noted that both $p_{ir}$ and $p_{rgb}$ use homogeneous coordinates, so when constructing $p_{ir}$, original pixel coordinates (x, y) should be multiplied by the depth value, final RGB pixel coordinates is required to divide $p_{rgb}$ by a component z, i.e., (x/z, y/z), and the value of the component z is a distance (in millimeters) from this point to the RGB camera.

External parameters of the infrared camera may include a rotation matrix $R_{ir}$ and a translation vector $T_{ir}$. External parameters of the RGB camera include a rotation matrix $R_{rgb}$ and a translation vector $T_{rgb}$. The external parameters of the camera represent transforming a point P in a world coordinate system to a camera coordinate system for transforming the infrared camera and the RGB camera respectively. There is the following relationship:

$$P_{ir}=R_{ir}P+T_{ir}$$

$$P_{rgb}=R_{rgb}P+T_{rgb} \quad \text{Formula (4)}$$

Formula (4) is converted to obtain:

$$P_{rgb}=R_{rgb}R_{ir}^{-1}P_{ir}+T_{rgb}-R_{rgb}R_{ir}^{-1}T_{ir} \quad \text{Formula (5)}$$

In conjunction with Formula (2), $$R=R_{rgb}R_{ir}^{-1}$$

$$T=T_{rgb}-R_{rgb}R_{ir}^{-1}T_{ir}=T_{rgb}-RT_{ir} \quad \text{Formula (6)}$$

The transformation relation between a coordinate system of the infrared camera and a coordinate system of the RGB camera may include the rotation matrix and the translation vector between the coordinate system of the infrared camera and the coordinate system of the RGB camera.

According to the camera calibration method, a target infrared image and an RGB image obtained by capturing the same scene by an infrared camera and an RGB camera are acquired responsive to that a preset condition is satisfied. The extraction is performed on the target infrared image to obtain a first feature point set, extraction is performed on the RGB image to obtain a second feature point set, and the first feature point set and the second feature point set are subjected to matching. A transformation relation between a coordinate system of the infrared camera and a coordinate system of the RGB camera is obtained by using the matched feature points. Accordingly, external parameters between the infrared camera and the RGB camera can be calibrated, the transformation relation between the two cameras can be calibrated, and the image definition is improved.

In one embodiment, the step of acquiring a target infrared image and an RGB image obtained by capturing the same scene by an infrared camera and an RGB camera responsive to that the image definition is lower than a definition threshold may include: detecting a working state of the electronic device 110 when the image definition is lower than the definition threshold; and acquiring the target infrared image and the RGB image obtained by capturing the same scene by the infrared camera and the RGB camera if the working state of the electronic device 110 is a preset working state.

The preset working state is a working state which is set in advance. The preset working state may include at least one of the following conditions: it is detected that a face for unlocking a screen fails to match with a pre-stored face; it is detected that the number of times of failure in matching a face for screen unlocking with a pre-stored face exceeds a first preset number of times; an instruction for starting the infrared camera and the RGB camera is received; it is detected that a difference between a current temperature and an initial temperature of a light emitter exceeds a temperature threshold; it is detected that a difference between a current temperature and an initial temperature of a light emitter exceeds a temperature threshold for a second preset number of times successively; or, a request for three-dimensional processing of a preview image is received.

Specifically, the instruction for starting the infrared camera and the RGB camera may be triggered by starting a camera application. After receiving a signal indicative of that a user triggers the camera application, the electronic device 110 may start the infrared camera and the RGB camera. After the cameras are started, a target infrared image and an RGB image obtained by capturing the same scene by the infrared camera and the RGB camera are acquired. When the cameras are turned on, the transformation relation between the coordinate systems of the infrared camera and the RGB camera is obtained, and the accuracy of an image subsequently captured by the cameras can be ensured.

The light emitter may be a laser light or the like. The initial temperature is the temperature of the light emitter at the calibration last time. The temperature of the light emitter is detected by a temperature sensor. The target infrared image and the RGB image obtained by capturing the same scene by the infrared camera and the RGB camera are acquired when a difference between the current temperature and the initial temperature of the light emitter exceeds a temperature threshold. Through temperature monitoring, when the temperature changes beyond the temperature threshold, the transformation relation between the infrared camera and the RGB camera is calibrated to ensure the accuracy of image capture.

The second preset number of times may be set as required, such as 2, 3, or 4. The temperature of the light emitter is detected by a temperature sensor. The target infrared image and the RGB image obtained by capturing the same scene by the infrared camera and the RGB camera are acquired when a difference between the current temperature and the initial temperature of the light emitter exceeds a temperature threshold for the second preset number of times successively. By setting the number of times, the frequency of calibration can be reduced, the accuracy of an image captured by a camera can be ensured, the number of calibrations can be reduced, and power consumption can be saved.

The screen unlocking mode may adopt a face verification mode. When the face matching fails, the electronic device 110 may acquire the target infrared image and the RGB image obtained by capturing the same scene by the infrared camera and the RGB camera, and perform matching to obtain a transformation relation between the coordinate systems of the infrared camera and the RGB camera. After face unlocking fails, the infrared camera and the RGB camera are calibrated, so that the accuracy of an image can be improved, and another face unlocking can be facilitated.

Further, when the number of times of failure in face matching exceeds a first preset number of times, the electronic device 110 may acquire the target infrared image and the RGB image obtained by capturing the same scene by the infrared camera and the RGB camera, and perform matching calculation to obtain a transformation relation between the coordinate systems of the infrared camera and the RGB camera. When the number of times of matching failure exceeds the first preset number of times, the transformation relation between the coordinate systems of the infrared camera and the RGB camera is calculated, thus avoiding calibration of the infrared camera and the RGB camera which has to be performed due to failure in face matching caused by other factors.

The request for three-dimensional processing may be generated by clicking a button by a user on a display screen, or may be generated by pressing a control by a user on a touch screen. The electronic device 110 may acquire an instruction for three-dimensional processing of an initial preview image. Three-dimensional processing refers to processing of three dimensions of an image, that is, three dimensions: length, width, and height. Specifically, the electronic device 110 may perform three-dimensional processing on an image by detecting depth information of an object or a face in the image by using a depth image or an infrared image. For example, the three-dimensional processing may be to perform facial processing on an image, and the electronic device 110 may determine an area where facial processing is required according to the depth information of the face, so that the facial effect of the image is better; the three-dimensional processing may also be three-dimensional face modeling, that is, establishing a corresponding three-dimensional face model or the like according to the face in the image. The electronic device 110 may receive an instruction for three-dimensional processing of an initial preview image. The initial preview image may refer to an image about surrounding environment information captured by the electronic device 110 through the camera, and the initial preview image may be displayed on the display screen of the electronic device 110 in real time. After receiving the instruction for three-dimensional processing of the initial preview image, the electronic device 110 may perform corresponding three-dimensional processing on the initial preview image.

In one embodiment, a target infrared image and an RGB image obtained by capturing the same scene by an infrared camera and an RGB camera are acquired in a case that the working state of the electronic device 110 is a preset working state. Feature points in the target infrared image are extracted to obtain a first feature point set, feature points in the RGB image are extracted to obtain a second feature point set, the first feature point set and the second feature point set are subjected to matching, and a transformation relation between a coordinate system of the infrared camera and a coordinate system of the RGB camera is acquired according to the matched feature points. The operation may include the steps as follows.

A target infrared image and an RGB image obtained by capturing the same scene by an infrared camera and an RGB camera are acquired in a case that the working state of the electronic device 110 is that a face for screen unlocking fails to match with a pre-stored face. Feature points in the target infrared image are extracted to obtain a first feature point set, feature points in the RGB image are extracted to obtain a second feature point set, and the first feature point set and the second feature point set are subjected to matching. A transformation relation between a coordinate system of the infrared camera and a coordinate system of the RGB camera is acquired according to the matched feature points.

A target infrared image and an RGB image obtained by capturing the same scene by an infrared camera and an RGB camera are acquired when it is detected again that the working state of the electronic device 110 is that an instruction for starting the infrared camera and the RGB camera is received. Feature points in the target infrared image are extracted to obtain a first feature point set, feature points in the RGB image are extracted to obtain a second feature point set, and the first feature point set and the second feature point set are subjected to matching. A transformation relation between a coordinate system of the infrared camera and a coordinate system of the RGB camera is acquired according to the matched feature points.

A target infrared image and an RGB image obtained by capturing the same scene by an infrared camera and an RGB camera are acquired when it is detected again that the working state of the electronic device 110 is that a difference between a current temperature and an initial temperature of a light emitter exceeds a temperature threshold. Feature points in the target infrared image are extracted to obtain a first feature point set, feature points in the RGB image are extracted to obtain a second feature point set, and the first feature point set and the second feature point set are subjected to matching. A transformation relation between a coordinate system of the infrared camera and a coordinate system of the RGB camera is acquired according to the matched feature points.

A target infrared image and an RGB image obtained by capturing the same scene by an infrared camera and an RGB camera are acquired when it is detected again that the working state of the electronic device 110 is that a request for three-dimensional processing of a preview image is received. Feature points in the target infrared image are extracted to obtain a first feature point set, feature points in the RGB image are extracted to obtain a second feature point set, and the first feature point set and the second feature point set are subjected to matching. A transformation relation between a coordinate system of the infrared camera and a coordinate system of the RGB camera is acquired according to the matched feature points.

Calibration may be performed in different working states of the electronic device 110. The timing of multiple calibrations is provided to ensure timely calibration for the definition of the captured image.

In the above embodiment, the target infrared image and the RGB image obtained by capturing the same scene by the infrared camera and the RGB camera may be acquired when the working state of the electronic device 110 is that the number of times of failure in matching a face for screen unlocking with a pre-stored face exceeds a first preset number of times.

In one embodiment, the operation of acquiring the target infrared image and the RGB image obtained by capturing the same scene by the infrared camera and the RGB camera when the working state of the electronic device is a preset working state may include the steps as follows.

A target infrared image and an RGB image obtained by capturing the same scene by an infrared camera and an RGB camera are acquired when the working state of the electronic device 110 is that a face for screen unlocking fails to match with a pre-stored face. Feature points in the target infrared image are extracted to obtain a first feature point set, feature points in the RGB image are extracted to obtain a second feature point set, and the first feature point set and the second feature point set are subjected to matching. A transformation relation between a coordinate system of the infrared camera and a coordinate system of the RGB camera is acquired according to the matched feature points.

A target infrared image and an RGB image obtained by capturing the same scene by an infrared camera and an RGB camera are acquired when it is detected again that the working state of the electronic device 110 is that an instruction for starting the infrared camera and the RGB camera is received. Feature points in the target infrared image are extracted to obtain a first feature point set, feature points in the RGB image are extracted to obtain a second feature point set, and the first feature point set and the second feature point set are subjected to matching. A transformation relation between a coordinate system of the infrared camera and a coordinate system of the RGB camera is acquired according to the matched feature points.

A target infrared image and an RGB image obtained by capturing the same scene by an infrared camera and an RGB camera are acquired when it is detected again that the working state of the electronic device 110 is that a difference between a current temperature and an initial temperature of a light emitter exceeds a temperature threshold for a second preset number of times successively. Feature points in the target infrared image are extracted to obtain a first feature point set, feature points in the RGB image are extracted to obtain a second feature point set, and the first feature point set and the second feature point set are subjected to matching. A transformation relation between a coordinate system of the infrared camera and a coordinate system of the RGB camera is acquired according to the matched feature points.

A target infrared image and an RGB image obtained by capturing the same scene by an infrared camera and an RGB camera are acquired when it is detected again that the working state of the electronic device 110 is that a request for three-dimensional processing of a preview image is received. Feature points in the target infrared image are extracted to obtain a first feature point set, feature points in the RGB image are extracted to obtain a second feature point set, and the first feature point set and the second feature point set are subjected to matching. A transformation relation between a coordinate system of the infrared camera and a coordinate system of the RGB camera is acquired according to the matched feature points.

Calibration may be performed in different working states of the electronic device 110, and the timing of multiple calibrations is provided to ensure timely calibration for the definition of a captured image.

In the above embodiment, the target infrared image and the RGB image obtained by capturing the same scene by the infrared camera and the RGB camera may be acquired when the working state of the electronic device 110 is that the number of times of failure in matching a face for screen unlocking with a pre-stored face exceeds a first preset number of times.

In one embodiment, the camera calibration method shown in FIG. 2 may further include that: the RGB image obtained by capturing the same scene by the RGB camera is acquired in a first operating environment, and the target infrared image obtained by capturing the same scene by the infrared camera is acquired in a second operating environment; and the feature points in the target infrared image are extracted in the second operating environment to obtain the first feature point set, the feature points in the RGB image are extracted in the first operating environment to obtain the second feature point set, the second feature point set is transmitted to the second operating environment, and the first feature point set and the second feature point set are subjected to matching in the second operating environment. The security level of the second operating environment is higher than that of the first operating environment.

Specifically, the first operating environment may be a Rich Execution Environment (REE), and the second operating environment may be a Trusted execution environment (TEE). The TEE has a higher security level than the REE. The matching of feature points in the second operating environment improves security and thus ensures data security.

In one embodiment, the camera calibration method shown in FIG. 2 may further include that: the RGB image obtained by capturing the same scene by the RGB camera is acquired in a first operating environment, and the target infrared image obtained by capturing the same scene by the infrared camera is acquired in a second operating environment; and the RGB image is transmitted to the second operating environment, the feature points in the target infrared image are extracted in the second operating environment to obtain the first feature point set, the feature points in the RGB image are extracted to obtain the second feature point set, and the first feature point set and the second feature point set are subjected to matching in the second operating environment. The security level of the second operating environment is higher than that of the first operating environment. The extraction and matching of feature points in the second operating environment improve security and thus ensure data security.

In one embodiment, the camera calibration method shown in FIG. 2 may further include that: the RGB image obtained by capturing the same scene by the RGB camera is acquired in a first operating environment, and the target infrared image obtained by capturing the same scene by the infrared camera is acquired in a second operating environment; the feature points in the target infrared image are extracted in the second operating environment to obtain the first feature point set, and the first feature point set is transmitted to the first operating environment; and the feature points in the RGB image are extracted in the first operating environment to obtain the second feature point set, and the first feature point set and the second feature point set are subjected to matching in the first operating environment. The security level of the second operating environment is higher than that of the first operating environment. The feature points are subjected to matching in the first operating environment, and the data processing efficiency is high.

In one embodiment, a camera calibration method may include the steps as follows.

Firstly, a target infrared image and an RGB image obtained by capturing the same scene by an infrared camera and an RGB camera are acquired when the working state of the electronic device 110 is that a face for screen unlocking fails to match with a pre-stored face. A first feature point set in the target infrared image and a second feature point set in the RGB image are extracted, and the first feature point set and the second feature point set are subjected to matching. A transformation relation between a coordinate system of the infrared camera and a coordinate system of the RGB camera is acquired according to the matched feature points.

Secondly, a target infrared image and an RGB image obtained by capturing the same scene by an infrared camera and an RGB camera are acquired when the working state of the electronic device 110 is that an instruction for starting the infrared camera and the RGB camera is received. A first feature point set in the target infrared image and a second feature point set in the RGB image are extracted, and the first feature point set and the second feature point set are subjected to matching. A transformation relation between a coordinate system of the infrared camera and a coordinate system of the RGB camera is acquired according to the matched feature points.

Optionally, a target infrared image and an RGB image obtained by capturing the same scene by an infrared camera and an RGB camera are acquired when the working state of the electronic device 110 is that a difference between a current temperature and an initial temperature of a light emitter exceeds a temperature threshold. A first feature point set in the target infrared image and a second feature point set in the RGB image are extracted, and the first feature point set and the second feature point set are subjected to matching. A transformation relation between a coordinate system of the infrared camera and a coordinate system of the RGB camera is acquired according to the matched feature points.

Optionally, a target infrared image and an RGB image obtained by capturing the same scene by an infrared camera and an RGB camera are acquired when the working state of the electronic device 110 is that a difference between a current temperature and an initial temperature of a light emitter exceeds a temperature threshold for a second preset number of times successively. A first feature point set in the target infrared image and a second feature point set in the RGB image are extracted, and the first feature point set and the second feature point set are subjected to matching. A transformation relation between a coordinate system of the infrared camera and a coordinate system of the RGB camera is acquired according to the matched feature points.

Optionally, a target infrared image and an RGB image obtained by capturing the same scene by an infrared camera and an RGB camera are acquired when the working state of the electronic device 110 is that a request for three-dimensional processing of a preview image is received. A first feature point set in the target infrared image and a second feature point set in the RGB image are extracted, and the first feature point set and the second feature point set are subjected to matching. A transformation relation between a coordinate system of the infrared camera and a coordinate system of the RGB camera is acquired according to the matched feature points.

Figure 3:
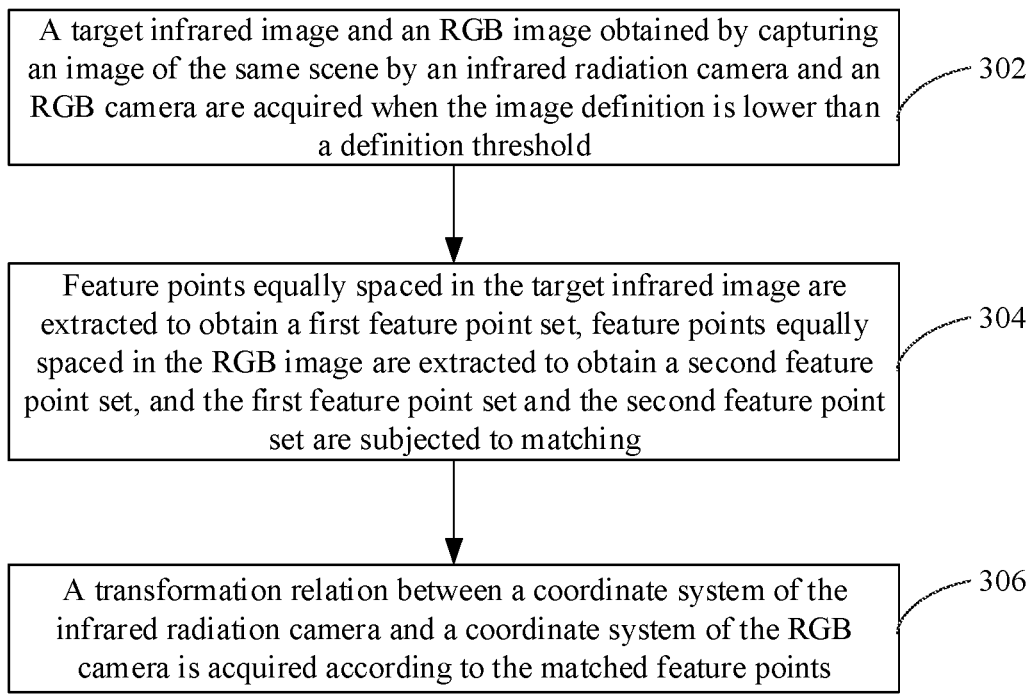

FIG. 3 shows a flowchart of a camera calibration method in one embodiment. As shown in FIG. 3, the camera calibration method may include the steps as follows.

At step 302, a target infrared image and an RGB image obtained by capturing the same scene by an infrared camera and an RGB camera are acquired when the image definition is lower than a definition threshold.

Specifically, the electronic device 110 may periodically detect an image captured by its own camera. It is indicated that the camera needs to be calibrated when the image definition is lower than a definition threshold. The definition threshold may be set as required, such as 80% and 90%. A Brenner gradient function may be used to calculate a square of a gray difference between two adjacent pixels to obtain the image definition. Also a sobel operator of a Tenegrad gradient function may be used to extract horizontal and vertical gradient values respectively, so that the image definition may be obtained based on the image definition of the Tenengrad gradient function. A variance function, an energy gradient function, a vollath function, an entropy function, an EAV point sharpness algorithm function, a Laplacian gradient function, an SMD gray variance function, and the like may also be used to detect the image definition.

At step 304, feature points equally spaced in the target infrared image are extracted to obtain a first feature point set, feature points equally spaced in the RGB image are extracted to obtain a second feature point set, and the first feature point set and the second feature point set are subjected to matching.

Specifically, feature points are obtained by performing SIFT detection on the target infrared image, and then feature points equally spaced are selected and added to the first feature point set; and feature points are obtained by performing SIFT detection on the RGB image, and then feature points equally spaced are selected and added to the second feature point set. SIFT is a description used in image processing. This description has scale invariance and detects key points in an image. The feature points in the first feature point set and the second feature point set are subjected to matching by SIFT. Equal spacing refers to that spacing between adjacent feature points is equal.

SIFT feature detection may include: searching image positions on all scales; determining a position and a scale by fitting at each candidate position; assigning one or more directions to each key point position based on the local gradient direction of an image; and measuring the local gradient of the image at a selected scale within an area around each key point.

SIFT feature matching may include: extracting feature vectors independent of scaling, rotation and brightness change from multiple images to obtain SIFT feature vectors; and using a Euclidean distance of the SIFT feature vectors to determine the similarity of key points in two images. The smaller the Euclidean distance is, the higher the similarity is. When the Euclidean distance is lower than a preset threshold, it can be determined that the matching is successful.

At step 306, a transformation relation between a coordinate system of the infrared camera and a coordinate system of the RGB camera is acquired according to the matched feature points.

It is assumed that $P_{ir}$ is a space coordinate of a point in an infrared camera coordinate, $p_{ir}$ is a projection coordinate (x and y are in pixels, and z is equal to a depth value in millimeters) of this point on an image plane, and $H_{ir}$ is an internal reference matrix of a depth camera. A pinhole imaging model shows that they satisfy the following relationships:

$$p_{ir}=H_{ir}P_{ir}$$

$$P_{ir}=H_{ir}^{-1}p_{ir} \quad \text{Formula (7)}$$

It is further assumed that $P_{rgb}$ is a space coordinate of the same point in a coordinate of the RGB camera, $p_{rgb}$ is a projection coordinate of this point on an RGB image plane, and $H_{rgb}$ is an internal reference matrix of the RGB camera. Since the coordinates of the infrared camera and the RGB camera are different, they may be linked by a rotation translation transformation, namely:

$$P_{rgb}=RP_{ir}+T \quad \text{Formula (8)}$$

where R is a rotation matrix, and T is a translation vector. $P_{rgb}$ is projected by $H_{rgb}$ to obtain an RGB coordinate corresponding to this point.

$$p_{rgb}=H_{rgb}P_{rgb} \quad \text{Formula (9)}$$

It is to be noted that both $p_{ir}$ and $p_{rgb}$ use homogeneous coordinates, so when $p_{ir}$ is constructed, original pixel coordinates (x, y) is required to be multiplied by a depth value, final RGB pixel coordinates are required to divide $p_{rgb}$ by a component z, i.e., (x/z, y/z), and the value of the component z is a distance (in millimeters) from this point to the RGB camera.

External parameters of the infrared camera may include a rotation matrix $R_{ir}$ and a translation vector $T_{ir}$. External parameters of the RGB camera may include a rotation matrix $R_{rgb}$ and a translation vector $T_{rgb}$. The external parameters of the camera represent transforming a point P in a world coordinate system to a camera coordinate system for transforming the infrared camera and the RGB camera respectively. There is the following relationship:

$$P_{ir}=R_{ir}P+T_{ir}$$

$$P_{rgb}=R_{rgb}P+T_{rgb} \quad \text{Formula (10)}$$

Formula (10) is converted to obtain:

$$P_{rgb}=R_{rgb}R_{ir}^{-1}P_{ir}+T_{rgb}-R_{rgb}R_{ir}^{-1}T_{ir} \quad \text{Formula (11)}$$

In conjunction with Formula (8) to obtain:

$$R=R_{rgb}R_{ir}^{-1}$$

$$T=T_{rgb}-R_{rgb}R_{ir}^{-1}T_{ir}=T_{rgb}-RT_{ir} \quad \text{Formula (12)}$$

The transformation relation between a coordinate system of the infrared camera and a coordinate system of the RGB camera may include a rotation matrix and a translation vector therebetween.

According to the camera calibration method, a target infrared image and an RGB image obtained by capturing the same scene by an infrared camera and an RGB camera are acquired when a preset condition is satisfied. Feature points equally spaced in the target infrared image are extracted to obtain a first feature point set, feature points equally spaced in the RGB image are extracted to obtain a second feature point set, and the first feature point set and the second feature point set are subjected to matching. A transformation relation between a coordinate system of the infrared camera and a coordinate system of the RGB camera is obtained by using the matched feature points. matching is more accurate by matching of equally spaced feature points. External parameters between the infrared camera and the RGB camera can be calibrated, the transformation relation between the two cameras is calibrated, and the image definition is improved.

In one embodiment, the step of acquiring a target infrared image and an RGB image obtained by capturing the same scene by an infrared camera and an RGB camera when the image definition is lower than a definition threshold may include: detecting a working state of the electronic device 110 when the image definition is lower than the definition threshold; and acquiring the target infrared image and the RGB image obtained by capturing the same scene by the infrared camera and the RGB camera when the working state of the electronic device 110 is a preset working state.

The preset working state is a working state which is set in advance. The preset working state may include at least one of the following conditions: an instruction for starting the infrared camera and the RGB camera is received; it is detected that a face for screen unlocking fails to match with a pre-stored face; or it is detected that the number of times of failure in matching a face for screen unlocking with a pre-stored face exceeds a first preset number of times.

Specifically, the instruction for starting the infrared camera and the RGB camera may be triggered by starting a camera application. After receiving a signal indicative of that a user triggers the camera application, the electronic device 110 may start the infrared camera and the RGB camera. After the cameras are started, a target infrared image and an RGB image obtained by capturing the same scene by the infrared camera and the RGB camera are acquired. When the cameras are turned on, the transformation relation between the coordinate systems of the infrared camera and the RGB camera is obtained, and the accuracy of an image subsequently captured by the cameras can be ensured.

The screen unlocking mode may adopt a face verification mode. When the face matching fails, the electronic device 110 may acquire the target infrared image and the RGB image obtained by capturing the same scene by the infrared camera and the RGB camera, and perform matching calculation to obtain a transformation relation between the coordinate systems of the infrared camera and the RGB camera. After face unlocking fails, the infrared camera and the RGB camera are calibrated, so that the accuracy of an image can be improved, and another face unlocking can be facilitated.

Further, when the number of times of failure in face matching exceeds a first preset number of times, the electronic device 110 may acquire the target infrared image and the RGB image obtained by capturing the same scene by the infrared camera and the RGB camera, and perform matching calculation to obtain a transformation relation between the coordinate systems of the infrared camera and the RGB camera.

When the number of times of matching failure exceeds the first preset number of times, the transformation relation between the coordinate systems of the infrared camera and the RGB camera is calculated, thus avoiding calibration of the infrared camera and the RGB camera which has to be performed due to failure in face matching caused by other factors.

In one embodiment, the step of acquiring the target infrared image and the RGB image obtained by capturing the same scene by the infrared camera and the RGB camera when the working state of the electronic device 110 is a preset working state may include that: the target infrared image and the RGB image obtained by capturing the same scene by the infrared camera and the RGB camera are acquired when a face for screen unlocking fails to match with a pre-stored face; and the target infrared image and the RGB image obtained by capturing the same scene by the infrared camera and the RGB camera are acquired when an instruction for starting the infrared camera and the RGB camera is received.

Specifically, a target infrared image and an RGB image obtained by capturing the same scene by an infrared camera and an RGB camera are acquired when the working state of the electronic device 110 is that a face for screen unlocking fails to match with a pre-stored face. Feature points equally spaced in the target infrared image are extracted to obtain a first feature point set, feature points equally spaced in the RGB image are extracted to obtain a second feature point set, and the first feature point set and the second feature point set are subjected to matching. A transformation relation between a coordinate system of the infrared camera and a coordinate system of the RGB camera is acquired according to the matched feature points.

A target infrared image and an RGB image obtained by capturing the same scene by an infrared camera and an RGB camera are acquired when it is detected again that the working state of the electronic device 110 is that an instruction for starting the infrared camera and the RGB camera is received. Feature points equally spaced in the target infrared image are extracted to obtain a first feature point set, feature points equally spaced in the RGB image are extracted to obtain a second feature point set, and the first feature point set and the second feature point set are subjected to matching. A transformation relation between a coordinate system of the infrared camera and a coordinate system of the RGB camera is acquired according to the matched feature points.

In one embodiment, the operation of acquiring the target infrared image and the RGB image obtained by capturing the same scene by the infrared camera and the RGB camera when the working state of the electronic device 110 is a preset working state may include the operations as follows.

The target infrared image and the RGB image obtained by capturing the same scene by the infrared camera and the RGB camera are acquired responsive to that the number of times of failure in matching a face for screen unlocking with a pre-stored face exceeds a first preset number of times; and the target infrared image and the RGB image obtained by capturing the same scene by the infrared camera and the RGB camera are acquired if an instruction for starting the infrared camera and the RGB camera is received.

Specifically, a target infrared image and an RGB image obtained by capturing the same scene by an infrared camera and an RGB camera are acquired when the working state of the electronic device 110 is detected to be that the number of times of failure in matching a face for screen unlocking with a pre-stored face exceeds a first preset number of times. Feature points equally spaced in the target infrared image are extracted to obtain a first feature point set, feature points equally spaced in the RGB image are extracted to obtain a second feature point set, and the first feature point set and the second feature point set are subjected to matching. A transformation relation between a coordinate system of the infrared camera and a coordinate system of the RGB camera is acquired according to the matched feature points.

A target infrared image and an RGB image obtained by capturing the same scene by an infrared camera and an RGB camera are acquired when it is detected again that the working state of the electronic device 110 is that an instruction for starting the infrared camera and the RGB camera is received. Feature points equally spaced in the target infrared image are extracted to obtain a first feature point set, feature points equally spaced in the RGB image are extracted to obtain a second feature point set, and the first feature point set and the second feature point set are subjected to matching. A transformation relation between a coordinate system of the infrared camera and a coordinate system of the RGB camera is acquired according to the matched feature points.

In one embodiment, the camera calibration method shown in FIG. 3 may further include that: the RGB image obtained by capturing the same scene by the RGB camera is acquired in a first operating environment, and the target infrared image obtained by capturing the same scene by the infrared camera is acquired in a second operating environment; and the feature points equally spaced in the target infrared image are extracted in the second operating environment to obtain the first feature point set, the feature points equally spaced in the RGB image are extracted in the first operating environment to obtain the second feature point set, the second feature point set is transmitted to the second operating environment, and the first feature point set and the second feature point set are subjected to matching in the second operating environment. The security level of the second operating environment is higher than that of the first operating environment.

Specifically, the first operating environment may be an REE, and the second operating environment may be a TEE. The TEE has a higher security level than the REE. The matching of feature points in the second operating environment improves security and thus ensures data security.

In one embodiment, the camera calibration method shown in FIG. 3 may further include that: the RGB image obtained by capturing the same scene by the RGB camera is acquired in a first operating environment, and the target infrared image obtained by capturing the same scene by the infrared camera is acquired in a second operating environment; and the RGB image is transmitted to the second operating environment, the feature points equally spaced in the target infrared image are extracted in the second operating environment to obtain the first feature point set, the feature points equally spaced in the RGB image are extracted to obtain the second feature point set, and the first feature point set and the second feature point set are subjected to matching in the second operating environment, the security level of the second operating environment being higher than that of the first operating environment. The extraction and matching of feature points in the second operating environment improve security and thus ensure data security.

In one embodiment, the camera calibration method shown in FIG. 3 may further include that: the RGB image obtained by capturing the same scene by the RGB camera is acquired in a first operating environment, and the target infrared image obtained by capturing the same scene by the infrared camera is acquired in a second operating environment; the feature points equally spaced in the target infrared image are extracted in the second operating environment to obtain the first feature point set, and the first feature point set is transmitted to the first operating environment; and the feature points equally spaced in the RGB image are extracted in the first operating environment to obtain the second feature point set, and the first feature point set and the second feature point set are subjected to matching in the first operating environment, the security level of the second operating environment being higher than that of the first operating environment. The feature points are subjected to matching in the first operating environment, and the data processing efficiency is high.

Figure 4:
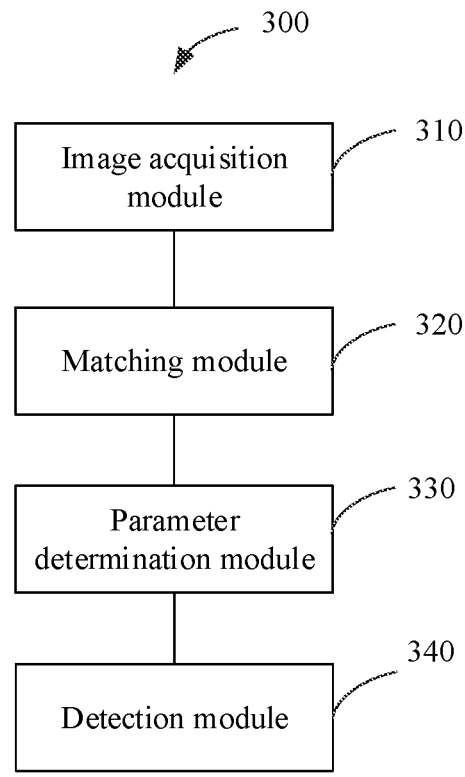
FIG. 4 shows a structure block diagram of a camera calibration apparatus according to some embodiments of the present application.

FIG. 4 shows a structure block diagram of a camera calibration apparatus 300 in one embodiment. As shown in FIG. 4, the camera calibration apparatus 300 includes an image acquisition module 310, a matching module 320 and a parameter determination module 330. The image acquisition module 310 is configured to acquire a target infrared image and an RGB image obtained by capturing the same scene by an infrared camera and an RGB camera responsive to that the image definition is lower than a definition threshold. The matching module 320 is configured to extract feature points from the target infrared image to obtain a first feature point set, extract feature points from the RGB image to obtain a second feature point set, and match the first feature point set with the second feature point set. The parameter determination module 330 is configured to acquire a transformation relation between a coordinate system of the infrared camera and a coordinate system of the RGB camera according to the matched feature points.

When the camera calibration apparatus 300 of the present application detects that the image definition is lower than a definition threshold, a target infrared image and an RGB image obtained by capturing the same scene by an infrared camera and an RGB camera are acquired when a preset condition is satisfied. The target infrared image is extracted to obtain a first feature point set, the RGB image is extracted to obtain a second feature point set, and the first feature point set and the second feature point set are subjected to matching. A transformation relation between a coordinate system of the infrared camera and a coordinate system of the RGB camera is obtained by using the matched feature points. External parameters between the infrared camera and the RGB camera can be calibrated, the transformation relation between the two cameras is calibrated, and the image definition is improved.

In one embodiment, as shown in FIG. 4, the camera calibration apparatus 300 may further include a detection module 340. The detection module 340 is configured to detect a working state of the electronic device 110 (as shown in FIG. 1) when the image definition is lower than the definition threshold. The image acquisition module 310 is further configured to acquire the target infrared image and the RGB image obtained by capturing the same scene by the infrared camera and the RGB camera when the working state of the electronic device 110 is a preset working state.

In one embodiment, the preset working state may include at least one of the following conditions: it is detected that a face for screen unlocking fails to match with a pre-stored face; it is detected that the number of times of failure in matching a face for screen unlocking with a pre-stored face exceeds a first preset number of times; an instruction for starting the infrared camera and the RGB camera is received; it is detected that a difference between a current temperature and an initial temperature of a light emitter exceeds a temperature threshold; it is detected that a difference between a current temperature and an initial temperature of a light emitter exceeds a temperature threshold for a second preset number of times successively; or, a request for three-dimensional processing of a preview image is received.

In one embodiment, as shown in FIG. 4, the image acquisition module 310 may be further configured to acquire a target infrared image and an RGB image obtained by capturing the same scene by an infrared camera and an RGB camera when the working state of the electronic device 110 is that a face for screen unlocking fails to match with a pre-stored face. The matching module 320 may be further configured to extract feature points from the target infrared image to obtain a first feature point set, extract feature points from the RGB image to obtain a second feature point set, and match the first feature point set with the second feature point set. The parameter determination module 330 may be further configured to acquire a transformation relation between a coordinate system of the infrared camera and a coordinate system of the RGB camera according to the matched feature points.

The image acquisition module 310 may be further configured to acquire a target infrared image and an RGB image obtained by capturing the same scene by an infrared camera and an RGB camera when it is detected again that the working state of the electronic device 110 is that an instruction for starting the infrared camera and the RGB camera is received. The matching module 320 may be further configured to extract feature points from the target infrared image to obtain a first feature point set, extract feature points from the RGB image to obtain a second feature point set, and match the first feature point set with the second feature point set. The parameter determination module 330 may be further configured to acquire a transformation relation between a coordinate system of the infrared camera and a coordinate system of the RGB camera according to the matched feature points.

The image acquisition module 310 may be further configured to acquire a target infrared image and an RGB image obtained by capturing the same scene by an infrared camera and an RGB camera when it is detected again that the working state of the electronic device 110 is that a difference between a current temperature and an initial temperature of a light emitter exceeds a temperature threshold. The matching module 320 may be further configured to extract feature points from the target infrared image to obtain a first feature point set, extract feature points from the RGB image to obtain a second feature point set, and match the first feature point set with the second feature point set. The parameter determination module 330 may be further configured to acquire a transformation relation between a coordinate system of the infrared camera and a coordinate system of the RGB camera according to the matched feature points.

The image acquisition module 310 may be further configured to acquire a target infrared image and an RGB image obtained by capturing the same scene by an infrared camera and an RGB camera when it is detected again that the working state of the electronic device is that a request for three-dimensional processing of a preview image is received. The matching module 320 may be further configured to extract feature points from the target infrared image to obtain a first feature point set, extract feature points from the RGB image to obtain a second feature point set, and match the first feature point set and the second feature point set. The parameter determination module 330 may be further configured to acquire a transformation relation between a coordinate system of the infrared camera and a coordinate system of the RGB camera according to the matched feature points.

Calibration may be performed in different working states of the electronic device 110, and the timing of multiple calibrations is provided to ensure timely calibration for the definition of the captured image.

In the above embodiment, the image acquisition module 310 may be further configured to acquire the target infrared image and the RGB image obtained by capturing the same scene by the infrared camera and the RGB camera when the working state of the electronic device 110 is that the number of times of failure in matching a face for screen unlocking with a pre-stored face exceeds a first preset number of times.

In one embodiment, the image acquisition module 310 may be further configured to acquire a target infrared image and an RGB image obtained by capturing the same scene by an infrared camera and an RGB camera when the working state of the electronic device 110 is that a face for screen unlocking fails to match with a pre-stored face. The matching module 320 may be further configured to extract feature points from the target infrared image to obtain a first feature point set, extract feature points from the RGB image to obtain a second feature point set, and match the first feature point set with the second feature point set. The parameter determination module 330 may be further configured to acquire a transformation relation between a coordinate system of the infrared camera and a coordinate system of the RGB camera according to the matched feature points.

The image acquisition module 310 may be further configured to acquire a target infrared image and an RGB image obtained by capturing the same scene by an infrared camera and an RGB camera when it is detected again that the working state of the electronic device 110 is that an instruction for starting the infrared camera and the RGB camera is received. The matching module 320 may be further configured to extract feature points in the target infrared image to obtain a first feature point set, extract feature points in the RGB image to obtain a second feature point set, and match the first feature point set and the second feature point set. The parameter determination module 330 is further configured to acquire a transformation relation between a coordinate system of the infrared camera and a coordinate system of the RGB camera according to the matched feature points.

The image acquisition module 310 may be further configured to acquire a target infrared image and an RGB image obtained by capturing the same scene by an infrared camera and an RGB camera when it is detected again that the working state of the electronic device 110 is that a difference between a current temperature and an initial temperature of a light emitter exceeds a temperature threshold for a second preset number of times successively. The matching module 320 may be further configured to extract feature points from the target infrared image to obtain a first feature point set, extract feature points from the RGB image to obtain a second feature point set, and match the first feature point set and the second feature point set. The parameter determination module 330 may be further configured to acquire a transformation relation between a coordinate system of the infrared camera and a coordinate system of the RGB camera according to the matched feature points.

The image acquisition module 310 may be further configured to acquire a target infrared image and an RGB image obtained by capturing the same scene by an infrared camera and an RGB camera when it is detected again that the working state of the electronic device 110 is that a request for three-dimensional processing of a preview image is received. The matching module 320 may be further configured to extract feature points from the target infrared image to obtain a first feature point set, extract feature points from the RGB image to obtain a second feature point set, and match the first feature point set and the second feature point set. The parameter determination module 330 may be further configured to acquire a transformation relation between a coordinate system of the infrared camera and a coordinate system of the RGB camera according to the matched feature points.

Calibration may be performed in different working states of the electronic device 110, and the timing of multiple calibrations is provided to ensure timely calibration for the definition of the captured image.

In the above embodiment, the image acquisition module 310 may be configured to acquire the target infrared image and the RGB image obtained by capturing the same scene by the infrared camera and the RGB camera when the working state of the electronic device 110 is that the number of times of failure in matching a face for screen unlocking with a pre-stored face exceeds a first preset number of times.

In one embodiment, the image acquisition module 310 may be further configured to acquire the RGB image obtained by capturing the same scene by the RGB camera in a first operating environment, and acquire the target infrared image obtained by capturing the same scene by the infrared camera in a second operating environment. The matching module 320 may be further configured to extract the feature points from the target infrared image in the second operating environment to obtain the first feature point set, extract the feature points from the RGB image in the first operating environment to obtain the second feature point set, transmit the second feature point set to the second operating environment, and match the first feature point set with the second feature point set in the second operating environment. The security level of the second operating environment is higher than that of the first operating environment.

Specifically, the first operating environment may be an REE, and the second operating environment may be a TEE. The TEE has a higher security level than the REE. The matching of feature points in the second operating environment improves security and thus ensures data security.

In one embodiment, the image acquisition module 310 may be further configured to acquire the RGB image obtained by capturing the same scene by the RGB camera in a first operating environment, and acquire the target infrared image obtained by capturing the same scene by the infrared camera in a second operating environment. The matching module 320 may be further configured to transmit the RGB image to the second operating environment, extract the feature points from the target infrared image in the second operating environment to obtain the first feature point set, extract the feature points in the RGB image to obtain the second feature point set, and match the first feature point set with the second feature point set in the second operating environment. The security level of the second operating environment is higher than that of the first operating environment. The extraction and matching of feature points in the second operating environment improve security and thus ensure data security.

In one embodiment, the image acquisition module 310 may be further configured to acquire the RGB image obtained by capturing the same scene by the RGB camera in a first operating environment, and acquire the target infrared image obtained by capturing the same scene by the infrared camera in a second operating environment. The matching module 320 may be further configured to extract the feature points from the target infrared image in the second operating environment to obtain the first feature point set, transmit the first feature point set to the first operating environment, extract the feature points from the RGB image in the first operating environment to obtain the second feature point set, and match the first feature point set with the second feature point set in the first operating environment. The security level of the second operating environment is higher than that of the first operating environment. The feature points are subjected to matching in the first operating environment, and the data processing efficiency is high.

Referring to FIG. 4, in one embodiment, the image acquisition module 310 may be configured to acquire a target infrared image and an RGB image obtained by capturing the same scene by an infrared camera and an RGB camera when the image definition is lower than a definition threshold. The matching module 320 may be configured to extract feature points equally spaced in the target infrared image to obtain a first feature point set, extract feature points equally spaced in the RGB image to obtain a second feature point set, and match the first feature point set with the second feature point set. The parameter determination module 330 may be configured to acquire a transformation relation between a coordinate system of the infrared camera and a coordinate system of the RGB camera according to the matched feature points.

When the camera calibration apparatus 300 of the present application satisfies a preset condition, a target infrared image and an RGB image obtained by capturing the same scene by an infrared camera and an RGB camera are acquired. Feature points equally spaced in the target infrared image are extracted to obtain a first feature point set, feature points equally spaced in the RGB image are extracted to obtain a second feature point set, and the first feature point set and the second feature point set are subjected to matching. A transformation relation between a coordinate system of the infrared camera and a coordinate system of the RGB camera is obtained by using the matched feature points. Matching is more accurate by matching of equally spaced feature points. External parameters between the infrared camera and the RGB camera can be calibrated, the transformation relation between the two cameras is calibrated, and the image definition is improved.

In one embodiment, the detection module 340 in the camera calibration apparatus 300 may be configured to detect a working state of the electronic device when the image definition is lower than the definition threshold. The image acquisition module 310 may be further configured to acquire the target infrared image and the RGB image obtained by capturing the same scene by the infrared camera and the RGB camera when the working state of the electronic device is a preset working state.

The preset working state may include at least one of the following conditions: an instruction for starting the infrared camera and the RGB camera is received; it is detected that a face for screen unlocking fails to match with a pre-stored face; or it is detected that the number of times of failure in matching a face for screen unlocking with a pre-stored face exceeds a first preset number of times.

In one embodiment, the image acquisition module 310 may be further configured to: acquire the target infrared image and the RGB image obtained by capturing the same scene by the infrared camera and the RGB camera when a face for screen unlocking fails to match with a pre-stored face; and acquire the target infrared image and the RGB image obtained by capturing the same scene by the infrared camera and the RGB camera when an instruction for starting the infrared camera and the RGB camera is received.

Specifically, the image acquisition module 310 may be configured to acquire a target infrared image and an RGB image obtained by capturing the same scene by an infrared camera and an RGB camera when the working state of the electronic device 110 is that a face for screen unlocking fails to match with a pre-stored face. The matching module 320 may be configured to extract feature points equally spaced in the target infrared image to obtain a first feature point set, extract feature points equally spaced in the RGB image to obtain a second feature point set, and match the first feature point set and the second feature point set. The parameter determination module 330 may be configured to acquire a transformation relation between a coordinate system of the infrared camera and a coordinate system of the RGB camera according to the matched feature points.

Further, the image acquisition module 310 may be further configured to acquire a target infrared image and an RGB image obtained by capturing the same scene by an infrared camera and an RGB camera when the working state of the electronic device 110 is that an instruction for starting the infrared camera and the RGB camera is received. The matching module 320 may be further configured to extract feature points equally spaced in the target infrared image to obtain a first feature point set, extract feature points equally spaced in the RGB image to obtain a second feature point set, and match the first feature point set with the second feature point set. The parameter determination module 330 may be further configured to acquire a transformation relation between a coordinate system of the infrared camera and a coordinate system of the RGB camera according to the matched feature points.

In one embodiment, the image acquisition module 310 may be further configured to acquire the RGB image obtained by capturing the same scene by the RGB camera in a first operating environment, and acquire the target infrared image obtained by capturing the same scene by the infrared camera in a second operating environment. The matching module 320 may be further configured to extract the feature points equally spaced in the target infrared image in the second operating environment to obtain the first feature point set, extract the feature points equally spaced in the RGB image in the first operating environment to obtain the second feature point set, transmit the second feature point set to the second operating environment, and match the first feature point set with the second feature point set in the second operating environment. The security level of the second operating environment is higher than that of the first operating environment.

In one embodiment, the image acquisition module 310 may be further configured to acquire the RGB image obtained by capturing the same scene by the RGB camera in a first operating environment, and acquire the target infrared image obtained by capturing the same scene by the infrared camera in a second operating environment. The matching module 320 may be further configured to transmit the RGB image to the second operating environment, extract the feature points equally spaced in the target infrared image in the second operating environment to obtain the first feature point set, extract the feature points equally spaced in the RGB image to obtain the second feature point set, and match the first feature point set with the second feature point set in the second operating environment, the security level of the second operating environment being higher than that of the first operating environment.

In one embodiment, the image acquisition module 310 may be further configured to acquire the RGB image obtained by capturing the same scene by the RGB camera in a first operating environment, and acquire the target infrared image obtained by capturing the same scene by the infrared camera in a second operating environment. The matching module 320 may be further configured to extract the feature points equally spaced in the target infrared image in the second operating environment to obtain the first feature point set, transmit the first feature point set to the first operating environment, extract the feature points equally spaced in the RGB image in the first operating environment to obtain the second feature point set, and match the first feature point set with the second feature point set in the first operating environment, the security level of the second operating environment being higher than that of the first operating environment.

Figure 5:
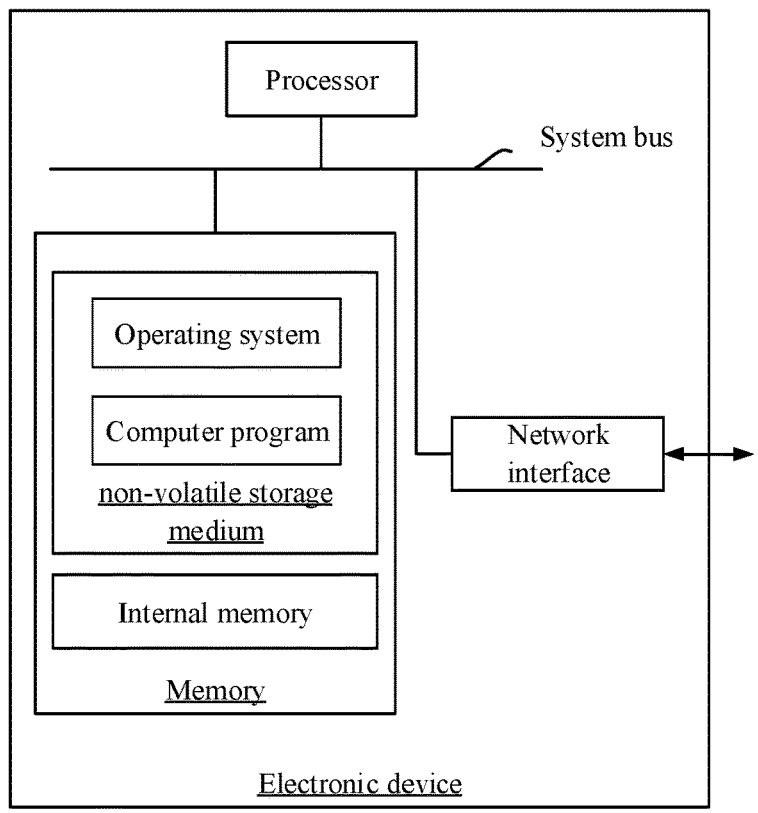
FIG. 5 schematically shows an internal structure diagram of an electronic device according to some embodiments of the present application.

Referring to FIG. 5, the embodiment of the present application also provides an electronic device. The electronic device includes a memory and a processor, the memory is configured to store a computer program, and the computer program is capable of being executed by the processor to enable the processor to perform the operations in the camera calibration method according to any one of the above embodiments.

For example, when the computer program is executed by the processor, the processor may perform the following steps that: a target infrared image and an RGB image obtained by capturing the same scene by an infrared camera and an RGB camera are acquired responsive to that the image definition is lower than a definition threshold; feature points in the target infrared image are extracted to obtain a first feature point set, feature points in the RGB image are extracted to obtain a second feature point set, and the first feature point set and the second feature point set are subjected to matching; and a transformation relation between a coordinate system of the infrared camera and a coordinate system of the RGB camera is acquired according to the matched feature points.

For another example, when the computer program is executed by the processor, the processor may perform the following steps that: a working state of the electronic device is detected when the image definition is lower than a definition threshold; a target infrared image and an RGB image obtained by capturing the same scene by an infrared camera and an RGB camera are acquired when the working state of the electronic device is a preset working state; feature points in the target infrared image are extracted to obtain a first feature point set, feature points in the RGB image are extracted to obtain a second feature point set, and the first feature point set and the second feature point set are subjected to matching; and a transformation relation between a coordinate system of the infrared camera and a coordinate system of the RGB camera is acquired according to the matched feature points.

For another example, when the computer program is executed by the processor, the processor may perform the following steps that: the RGB image obtained by capturing the same scene by the RGB camera is acquired in a first operating environment, and the target infrared image obtained by capturing the same scene by the infrared camera is acquired in a second operating environment; and the feature points in the target infrared image are extracted in the second operating environment to obtain the first feature point set, the feature points in the RGB image are extracted in the first operating environment to obtain the second feature point set, the second feature point set is transmitted to the second operating environment, and the first feature point set and the second feature point set are subjected to matching in the second operating environment. The security level of the second operating environment is higher than that of the first operating environment.

For another example, when the computer program is executed by the processor, the processor may perform the following steps that: a target infrared image and an RGB image obtained by capturing the same scene by an infrared camera and an RGB camera are acquired when the image definition is lower than a definition threshold; feature points equally spaced in the target infrared image are extracted to obtain a first feature point set, feature points equally spaced in the RGB image are extracted to obtain a second feature point set, and the first feature point set and the second feature point set are subjected to matching; and a transformation relation between a coordinate system of the infrared camera and a coordinate system of the RGB camera is acquired according to the matched feature points.

For another example, when the computer program is executed by the processor, the processor may perform the following steps that: a working state of the electronic device 110 is detected when the image definition is lower than a definition threshold; a target infrared image and an RGB image obtained by capturing the same scene by an infrared camera and an RGB camera are acquired when the working state of the electronic device 110 is a preset working state; feature points equally spaced in the target infrared image are extracted to obtain a first feature point set, feature points equally spaced in the RGB image are extracted to obtain a second feature point set, and the first feature point set and the second feature point set are subjected to matching; and a transformation relation between a coordinate system of the infrared camera and a coordinate system of the RGB camera is acquired according to the matched feature points.

For another example, when the computer program is executed by the processor, the processor may perform the following steps that: the RGB image obtained by capturing the same scene by the RGB camera is acquired in a first operating environment, and the target infrared image obtained by capturing the same scene by the infrared camera is acquired in a second operating environment; and the RGB image is transmitted to the second operating environment, the feature points equally spaced in the target infrared image are extracted in the second operating environment to obtain the first feature point set, the feature points equally spaced in the RGB image are extracted to obtain the second feature point set, and the first feature point set and the second feature point set are subjected to matching in the second operating environment, the security level of the second operating environment being higher than that of the first operating environment.

Referring to FIG. 5, the embodiment of the present application provides a non-volatile computer-readable storage medium. The non-volatile computer-readable storage medium has a computer program stored thereon, wherein the computer program is executed by a processor to implement the operations in the camera calibration method according to any one of the above embodiments.

For example, when the computer program is executed by the processor, the following steps may be implemented: a target infrared image and an RGB image obtained by capturing the same scene by an infrared camera and an RGB camera are acquired responsive to that the image definition is lower than a definition threshold; feature points in the target infrared image are extracted to obtain a first feature point set, feature points in the RGB image are extracted to obtain a second feature point set, and the first feature point set and the second feature point set are subjected to matching; and a transformation relation between a coordinate system of the infrared camera and a coordinate system of the RGB camera is acquired according to the matched feature points.

For another example, when the computer program is executed by the processor, the following steps may also be implemented: a working state of the electronic device is detected when the image definition is lower than a definition threshold; a target infrared image and an RGB image obtained by capturing the same scene by an infrared camera and an RGB camera are acquired when the working state of the electronic device is a preset working state; feature points in the target infrared image are extracted to obtain a first feature point set, feature points in the RGB image are extracted to obtain a second feature point set, and the first feature point set and the second feature point set are subjected to matching; and a transformation relation between a coordinate system of the infrared camera and a coordinate system of the RGB camera is acquired according to the matched feature points.

For another example, when the computer program is executed by the processor, the following steps may also be implemented: the RGB image obtained by capturing the same scene by the RGB camera is acquired in a first operating environment, and the target infrared image obtained by capturing the same scene by the infrared camera is acquired in a second operating environment; and the feature points in the target infrared image are extracted in the second operating environment to obtain the first feature point set, the feature points in the RGB image are extracted in the first operating environment to obtain the second feature point set, the second feature point set is transmitted to the second operating environment, and the first feature point set and the second feature point set are subjected to matching in the second operating environment. The security level of the second operating environment is higher than that of the first operating environment.

For another example, when the computer program is executed by the processor, the following steps may also be implemented: a target infrared image and an RGB image obtained by capturing the same scene by an infrared camera and an RGB camera are acquired when the image definition is lower than a definition threshold; feature points equally spaced in the target infrared image are extracted to obtain a first feature point set, feature points equally spaced in the RGB image are extracted to obtain a second feature point set, and the first feature point set and the second feature point set are subjected to matching; and a transformation relation between a coordinate system of the infrared camera and a coordinate system of the RGB camera is acquired according to the matched feature points.

For another example, when the computer program is executed by the processor, the following steps may also be implemented: a working state of the electronic device 110 is detected when the image definition is lower than a definition threshold; a target infrared image and an RGB image obtained by capturing the same scene by an infrared camera and an RGB camera are acquired if the working state of the electronic device 110 is a preset working state; feature points equally spaced in the target infrared image are extracted to obtain a first feature point set, feature points equally spaced in the RGB image are extracted to obtain a second feature point set, and the first feature point set and the second feature point set are subjected to matching; and a transformation relation between a coordinate system of the infrared camera and a coordinate system of the RGB camera is acquired according to the matched feature points.

For another example, when the computer program is executed by the processor, the following steps may also be implemented: the RGB image obtained by capturing the same scene by the RGB camera is acquired in a first operating environment, and the target infrared image obtained by capturing the same scene by the infrared camera is acquired in a second operating environment; and the RGB image is transmitted to the second operating environment, the feature points equally spaced in the target infrared image are extracted in the second operating environment to obtain the first feature point set, the feature points equally spaced in the RGB image are extracted to obtain the second feature point set, and the first feature point set and the second feature point set are subjected to matching in the second operating environment, the security level of the second operating environment being higher than that of the first operating environment.

FIG. 5 is an internal structure diagram of an electronic device in an embodiment. As shown in FIG. 5, the electronic device includes a processor, a memory and a network interface, which are connected through a system bus. The processor is configured to provide computing and control capabilities for supporting the operation of the entire electronic device. The memory is configured to store data, programs, or the like. The memory may store at least one computer program, and the computer program may be executed by the processor. The memory may include a non-volatile storage medium and an internal memory. The non-volatile storage medium may store an operating system and a computer program. The computer program may be executed by the processor to implement the camera calibration method provided in each of the above embodiments. The internal memory may provide a cache environment for the operating system and the computer program in the non-volatile storage medium. The network interface may be an Ethernet card or a wireless network card for communicating with an external electronic device. The electronic device may be a mobile phone, a tablet, a personal digital assistant, a wearable device, or the like.

Each module in the camera calibration apparatus 300 provided in the embodiments of the present application may be implemented in the form of a computer program. The computer program may operate on a terminal or a server. A program module formed by the computer program may be stored on the memory of a terminal or a server. The computer program may be executed by the processor to implement the steps of the camera calibration method described in any one of the embodiments of the present application.

The embodiment of the present application also provides a computer program product including an instruction. When the computer program product operates on a computer, the computer is enabled to perform the camera calibration method described in any one of the embodiments of the present application.

Figure 6:
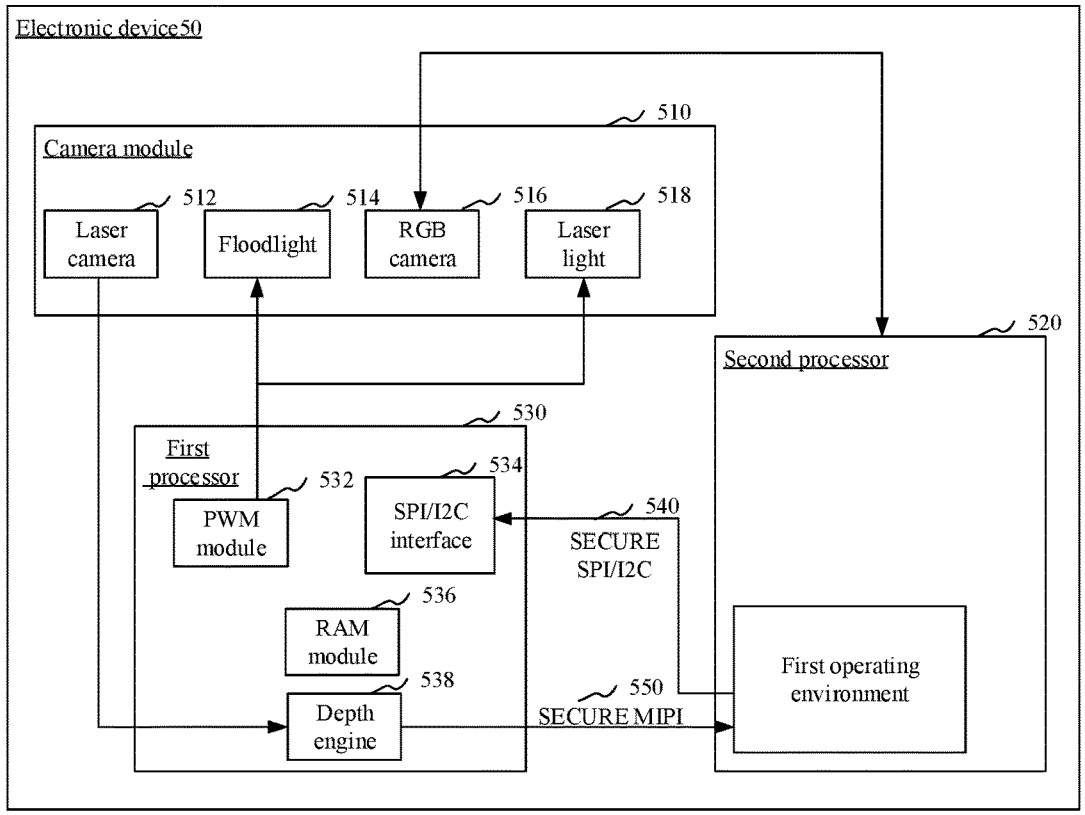
FIG. 6 schematically shows another application environment diagram of a camera calibration method according to some embodiments of the present application.

FIG. 6 is an internal structure diagram of an electronic device 50 in another embodiment. As shown in FIG. 6, the electronic device 50 may include a camera module 510, a second processor 520 and a first processor 530. The second processor 520 may be a Central Processing Unit (CPU) module. The first processor 530 may be a Micro Controller Unit (MCU) module or the like. The first processor 530 may be connected between the second processor 520 and the camera module 550, the first processor 530 may control a laser camera 512, a floodlight 514 and a laser light 518 in the camera module 510, and the second processor 520 may control an RGB camera 516 in the camera module 510. In one embodiment, the electronic device 50 in FIG. 6 and the electronic device in FIG. 5 may be the same electronic device. The functions of both the first processor 530 and the second processor 520 in FIG. 6 may be consistent with the functions of the processor in FIG. 5.

The camera module 510 may include a laser camera 512, a floodlight 514, an RGB camera 516 and a laser light 518. The laser camera 512 may be an infrared camera for acquiring an infrared image or a speckle image. The floodlight 514 may be a surface light source capable of emitting infrared light, and the laser light 518 may be a point light source capable of emitting laser light and forming a pattern by the emitted laser light. When the floodlight 514 emits infrared light, the laser camera 552 may acquire an infrared image according to reflected light. When the laser light 518 emits infrared laser light, the laser camera 512 may acquire a speckle image according to reflected light. The speckle image may be an image obtained by deforming a pattern formed by reflecting the infrared laser light reflected by the laser light 518.

The second processor 520 may include a CPU core which may operate in a TEE and a CPU core which may operate in an REE. Both the TEE and the REE are operating modes of advanced RISC machines. The security level of the TEE is high, and only one CPU core in the second processor 520 may operate in the TEE at the same time. Generally, an operation behavior with a higher security level in the electronic device 50 needs to be performed in the CPU core in the TEE, and an operation behavior with a lower security level can be performed in the CPU core in the REE.

The first processor 530 may include a Pulse Width Modulation (PWM) module 532, a Serial Peripheral Interface/Inter-Integrated Circuit (SPI/I2C) interface 534, a Random Access Memory (RAM) module 536, and a depth engine 538. The PWM module 532 may transmit a pulse to the camera module 510 to control the floodlight 514 or the laser light 518 to be turned on, so that the laser camera 512 may capture an infrared image or a speckle image. The SPI/I2C interface 534 may be configured to receive an image capturing instruction sent by the second processor 520. The depth engine 538 may process the speckle image to obtain a depth disparity map. The RAM 536 may store the infrared image and the speckle image acquired by the laser camera 512, and store a processed image obtained by processing the infrared image or the speckle image by the depth engine 538.

When the second processor 520 receives a data acquisition request from an application, for example, when the application needs to perform face unlocking and face payment, an image capturing instruction may be sent to the first processor 530 by the CPU core which operates in the TEE. After receiving the image capturing instruction, the first processor 530 may transmit a pulse wave through the PWM module 532 to control the floodlight 514 in the camera module 510 to be turned on to capture an infrared image through the laser camera 512, and to control the laser light 518 in the camera module 510 to be turned on to capture a speckle image through the laser camera 512. The camera module 510 may send the captured infrared image and speckle image to the first processor 530. The first processor 530 may process the received infrared image to obtain an infrared disparity map, and process the received speckle image to obtain a speckle disparity map or a depth disparity map. The processing by the first processor 530 on the infrared image and the speckle image may refer to correcting the infrared image or the speckle image, and removing the influence of internal and external parameters of the camera module 510 on the image. The first processor 530 may be set to different modes, and images output by different modes are different. When the first processor 530 is set to a speckle mode, the first processor 530 may process the speckle image to obtain a speckle disparity map, and a target speckle image may be obtained according to the speckle disparity map. When the first processor 530 is set to a depth map mode, the first processor 530 may process the speckle image to obtain a depth disparity map, and a depth image may be obtained according to the depth disparity map, the depth image referring to an image with depth information. The first processor 530 may send the infrared disparity map and the speckle disparity map to the second processor 520, and the first processor 530 may also send the infrared disparity map and the depth disparity map to the second processor 520. The second processor 520 may acquire an infrared image according to the infrared disparity map, and acquire a depth image according to the depth disparity map. Further, the second processor 520 may perform face recognition, face matching and bio-assay according to the infrared image and the depth image, and acquire depth information of the detected face.

The communication between the first processor 530 and the second processor 520 may be performed through a fixed security interface to ensure the security of data transmission. As shown in FIG. 6, the second processor 520 may send data to the first processor 530 through a SECURE SPI/I2C 540, and the first processor 530 may send data to the second processor 520 through a SECURE Mobile Industry Processor Interface (MIPI) 550. For example, the infrared image, the speckle image, the infrared disparity map, the speckle disparity map, the depth disparity map, the depth image and the like may be transmitted to the second processor 520 through the SECURE MIPI 550.

In one embodiment, the first processor 530 may also acquire the target infrared image according to the infrared disparity map, calculate to acquire the depth image according to the depth disparity map, and send the target infrared image and the depth image to the second processor 520.

In one embodiment, the first processor 530 may perform face recognition, face matching and bio-assay according to the target infrared image and the depth image, and acquire depth information of the detected face. The sending of the image by the first processor 530 to the second processor 520 means that the first processor 530 may send the image to the CPU core in the TEE in the second processor 520.

In one embodiment, the second processor 520 may detect whether the image definition is lower than a definition threshold, and acquire a target infrared image and an RGB image obtained by capturing the same scene by the infrared camera (i.e., the laser camera 512) and the RGB camera 516 when the image definition is lower than the definition threshold. Then, the second processor 520 may extract feature points equally spaced in the target infrared image to obtain a first feature point set, extract feature points equally spaced in the RGB image to obtain a second feature point set, and match the first feature point set with the second feature point set. Finally, the second processor 520 may acquire a transformation relation between a coordinate system of the infrared camera and a coordinate system of the RGB camera according to the matched feature points. The RGB image may be captured by the second processor 520 which controlling the RGB camera 516. The second processor 520 may send an instruction for acquiring an infrared image to the first processor 530, the first processor 530 may control the laser camera 512 (i.e., the infrared camera) to capture an infrared image, and the first processor 530 may send the infrared image through the SECURE MIPI to the second processor 520.

In one embodiment, the second processor 520 may detect a working state of the electronic device 50 when the image definition is lower than the definition threshold, and acquire the target infrared image and the RGB image obtained by capturing the same scene by the infrared camera and the RGB camera 516 when the working state of the electronic device 50 is a preset working state. Then, the second processor 520 may extract feature points equally spaced in the target infrared image to obtain a first feature point set, extract feature points equally spaced in the RGB image to obtain a second feature point set, and match the first feature point set with the second feature point set. Finally, the second processor 520 may acquire a transformation relation between a coordinate system of the infrared camera and a coordinate system of the RGB camera according to the matched feature points.

In one embodiment, the target infrared image may be acquired in the TEE, i.e., after the second processor 520 receives the infrared image, the infrared image may be stored in the TEE. The RGB image may be acquired in the REE, that is, after the second processor 520 receives the RGB image sent by the RGB camera, the RGB image may be stored in the REE. Then, the second processor 520 may send the RGB image to the TEE, extract a first feature point set from the target infrared image and a second feature point set from the RGB image, match the first feature point set with the second feature point set, and acquire a transformation relation between a coordinate system of the infrared camera and a coordinate system of the RGB camera according to the matched feature points.

In one embodiment, the target infrared image may be acquired in the TEE, i.e., after the second processor 520 receives the infrared image, the infrared image may be stored in the TEE. The RGB image may be acquired in the REE, that is, after the second processor 520 receives the RGB image sent by the RGB camera, the RGB image may be stored in the REE. Then, the second processor 520 may extract a first feature point set from the target infrared image, send the first feature point set to the REE, extract a second feature point set from the RGB image in the REE, and match the first feature point set with the second feature point set. Finally, the second processor 520 may acquire a transformation relation between a coordinate system of the infrared camera and a coordinate system of the RGB camera according to the matched feature points.

In one embodiment, the second processor 520 may detect whether the image definition is lower than a definition threshold, and acquire a target infrared image and an RGB image obtained by capturing the same scene by the infrared camera and the RGB camera when the image definition is lower than the definition threshold. Then, the second processor 520 may extract feature points equally spaced in the target infrared image to obtain a first feature point set, extract feature points equally spaced in the RGB image to obtain a second feature point set, and match the first feature point set with the second feature point set. Finally, the second processor 520 may acquire a transformation relation between a coordinate system of the infrared camera and a coordinate system of the RGB camera according to the matched feature points. The RGB image may be captured by the second processor 520 which controls the RGB camera 516. The second processor 520 may send an instruction for acquiring an infrared image to the first processor 530, the first processor 530 may control the laser camera 512 (i.e., the infrared camera) to capture an infrared image, and the first processor 530 may send the infrared image through the SECURE MIPI to the second processor 520.

In one embodiment, the second processor 520 may detect a working state of the electronic device 50 when the image definition is lower than the definition threshold, and acquire the target infrared image and the RGB image obtained by capturing the same scene by the infrared camera and the RGB camera 516 if the working state of the electronic device 50 is a preset working state. The second processor 520 may extract feature points equally spaced in the target infrared image to obtain a first feature point set, extract feature points equally spaced in the RGB image to obtain a second feature point set, and match the first feature point set with the second feature point set. Finally, the second processor 520 may acquire a transformation relation between a coordinate system of the infrared camera and a coordinate system of the RGB camera according to the matched feature points.

In one embodiment, an RGB image obtained by capturing the same scene by the RGB camera may be acquired in the REE, and a target infrared image obtained by capturing the same scene by the infrared camera may be acquired in the TEE. That is, after receiving the RGB image sent by the RGB camera, the second processor 520 may store the RGB image in the REE, and after receiving the infrared image, the second processor 520 may store the infrared image in the TEE. Then, the second processor 520 may extract feature points equally spaced in the target infrared image in the TEE to obtain a first feature point set, and extract feature points equally spaced in the RGB image in the REE to obtain a second feature point set. Then, the second processor 520 may transmit the second feature point set to the TEE, and match the first feature point set with the second feature point set in the TEE. The TEE has a higher security level than the REE.

In one embodiment, an RGB image obtained by capturing the same scene by the RGB camera may be acquired in the REE, and a target infrared image obtained by capturing the same scene by the infrared camera may be acquired in the TEE. That is, after receiving the RGB image sent by the RGB camera, the second processor 520 may store the RGB image in the REE, and after receiving the infrared image, the second processor 520 may store the infrared image in the TEE. Then, the second processor 520 may transmit the RGB image to the TEE, extract feature points equally spaced in the target infrared image in the TEE to obtain a first feature point set, and extract feature points equally spaced in the RGB image to obtain a second feature point set. Finally, the second processor 520 may match the first feature point set with the second feature point set in the TEE.

In one embodiment, an RGB image obtained by capturing the same scene by the RGB camera may be acquired in the REE, and a target infrared image obtained by capturing the same scene by the infrared camera may be acquired in the TEE. That is, after receiving the RGB image sent by the RGB camera, the second processor 520 may store the RGB image in the REE, and after receiving the infrared image, the second processor 520 may store the infrared image in the TEE. Then, the second processor 520 may extract feature points equally spaced in the target infrared image in the TEE to obtain a first feature point set, and transmit the first feature point set to the REE. Then, the second processor 520 may extract feature points equally spaced in the RGB image in the REE to obtain a second feature point set, and match the first feature point set with the second feature point set in the REE.

Figure 7:
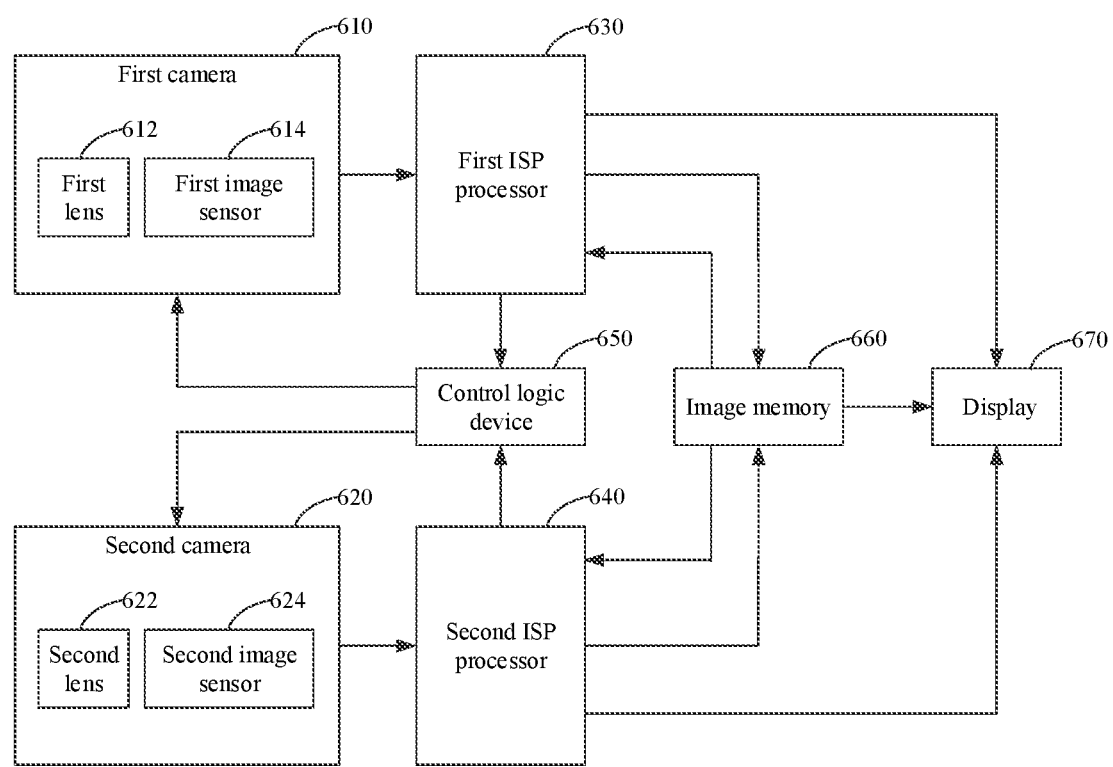
FIG. 7 schematically shows a diagram of an image processing circuit according to some embodiments of the present application.

An embodiment of the present application also provides an electronic device. The electronic device includes an image processing circuit. The image processing circuit may be implemented by hardware and/or software components, and may include various processors defining an Image Signal Processing (ISP) pipeline. FIG. 7 schematically shows a diagram of an image processing circuit in one embodiment. As shown in FIG. 7, for convenience of explanation, only various aspects of the image processing technology related to the embodiment of the present application are illustrated.

As shown in FIG. 7, the image processing circuit includes a first ISP processor 630, a second ISP processor 640, a control logic device 650, and an image memory 660.

The first camera 610 may include one or more first lenses 612 and a first image sensor 614. The first camera 610 may be an infrared camera. The first image sensor 614 may include an infrared filter. The first image sensor 614 may acquire light intensity and wavelength information captured by each of the imaging pixels in the first image sensor 614 and provide a set of image data that can be processed by the first ISP processor 630, the set of image data being used for generating an infrared image.

The second camera 620 may include one or more second lenses 622 and a second image sensor 624. The second camera may be an RGB camera. The second image sensor 624 may include a color filter array (such as a Bayer filter). The second image sensor 624 may acquire light intensity and wavelength information captured by each of the imaging pixels in the second image sensor 624 and provide a set of image data that can be processed by the second ISP processor 640, the set of image data being used for generating an RGB image.

In one example, the first ISP processor 630 may be the first processor 530 in FIG. 6, and the second ISP processor 640 may be the second processor 520 in FIG. 6. The image memory 660 may include two independent memories, one of which is located in the first ISP processor 630 (the memory may be the RAM 536 in FIG. 6), and the other one is located in the second ISP processor 640. The control logic device 650 also may include two independent control logics, one control logic device being located in the first ISP processor 630 for controlling the first camera 610 to acquire a first image (i.e., an infrared image), and the other control logic device being located in the second, ISP processor 640 for controlling the second camera 620 to acquire a second image (i.e., an RGB image).

The first image captured by the first camera 610 may be transmitted to the first ISP processor 630 for processing. After the first ISP processor 630 processes the first image, statistical data of the first image (such as the brightness of the image and the contrast of the image) may be sent to the control logic device 650. The control logic device 650 may determine control parameters of the first camera 610 according to the statistical data, so that the first camera 66 may perform operations such as auto focus and automatic exposure according to the control parameters. The first image may be stored in the image memory 660 after being processed by the first ISP processor 630, for example, the received infrared image may be processed to obtain an infrared disparity map or the like. The first ISP processor 630 may also read and process the images stored in the image memory 660.

The first ISP processor 630 may process image data pixel by pixel in a variety of formats. For example, each image pixel may have a bit depth of 8, 10, 12, or 14 bits, and the first ISP processor 630 may perform one or more image processing operations on the image data, and may collect statistical information about the image data. In the image processing operations, the definition may be calculated at the same or different bit depths.

Similarly, the second image captured by the second camera 620 may be transmitted to the second ISP processor 640 for processing. After the second ISP processor 640 processes the second image, statistical data of the second image (such as the brightness of the image, and the contrast of the image, and the color of the image) may be sent to the control logic device 650. The control logic device 650 may determine control parameters of the second camera 620 according to the statistical data, so that the second camera 620 may perform operations such as auto focus and automatic exposure according to the control parameters. The statistical data may include auto exposure, auto white balance, auto focus, flicker detection, black level compensation, shading correction of the second lens 622, etc. The control parameters may include gain, integration time of exposure control, antishake parameters, flash control parameters, control parameters of the first lens 612 (such as focal length for focus or zoom), or a combination of these parameters, etc. The second image may be stored in the image memory 660 after being processed by the second ISP processor 640, and the second ISP processor 640 may also read and process the images stored in the image memory 660. In addition, the second image may be processed by the ISP processor 640 and output to a display 670 for display, so as to be viewed by a user and/or further processed by a Graphics Processing Unit (GPU).

In one example, when the second ISP processor 640 detects that the image definition is lower than a definition threshold, the first ISP processor 630 may receive the image data acquired by the first camera 610 and process the image data to form a target infrared image. The first ISP processor 630 may send the target infrared image to the second ISP processor 640, and the second ISP processor 640 may receive the image data acquired by the second camera 620 and process the image data to form an RGB image. The second processor 640 may extract feature points from the target infrared image to obtain a first feature point set and extract feature points from the RGB image to obtain a second feature point set, match the first feature point set and the second feature point set, and acquire a transformation relation between a coordinate system of the infrared camera (i.e., the first camera 610) and a coordinate system of the RGB camera (i.e., the second camera 620) according to the matched feature points.

In one example, when the second ISP processor 640 detects that the image definition is lower than a definition threshold, the first ISP processor 630 may receive the image data acquired by the first camera 610 and process the image data to form a target infrared image. The first ISP processor 630 may send the target infrared image to the second ISP processor 640, and the second ISP processor 640 may receive the image data acquired by the second camera 620 and process the image data to form an RGB image. The second processor 640 may extract feature points equally spaced in the target infrared image to obtain a first feature point set, extract feature points equally spaced in the RGB image to obtain a second feature point set, match the first feature point set and the second feature point set, and then acquire a transformation relation between a coordinate system of the infrared camera (i.e., the first camera 610) and a coordinate system of the RGB camera (i.e., the second camera 620) according to the matched feature points.

Any reference used in the present application to a memory, storage, a database or other media may include non-volatile and/or volatile memories. The appropriate non-volatile memory may include a ROM, a Programmable ROM (PROM), an Electrically Programmable ROM (EPROM), an Electrically Erasable Programmable ROM (EEPROM), or a flash memory. The volatile memory may include a RAM, used as an external cache memory. As being illustrative instead of being limitative, the RAM may be obtained in multiple forms such as a Static RAM (SRAM), a Dynamic RAM (DRAM), a Synchronous DRAM (SDRAM), a Dual Data Rate SDRAM (DDR SDRAM), an Enhanced SDRAM (ESDRAM), a Synchlink DRAM (SLDRAM), a Rambus Direct RAM (RDRAM), a Direct Rambus Dynamic RAM (DRDRAM), and a Rambus Dynamic RAM (RDRAM).

The above embodiments only describe several implementation manners of the present application specifically and in detail, but cannot be thus understood as limitation to the patent scope of the present application. It is to be pointed out that those of ordinary skill in the art may also make several variations and improvements without departing from the concept of the present application. These variations and improvements fall within the scope of protection of the present application. Therefore, the scope of protection of the present application should be determined by the appended claims.

The invention claimed is:

1. A camera calibration method, comprising:
acquiring a target infrared image and a Red/Green/Blue (RGB) image obtained by capturing a same scene by an infrared camera and an RGB camera, responsive to that an image definition is lower than a definition threshold;
extracting feature points from the target infrared image to obtain a first feature point set, extracting feature points from the RGB image to obtain a second feature point set, and matching the first feature point set with the second feature point set; and
acquiring a transformation relation between a coordinate system of the infrared camera and a coordinate system of the RGB camera according to matched feature points,
wherein acquiring the target infrared image and the RGB image obtained by capturing the same scene by the infrared camera and the RGB camera responsive to that the image definition is lower than the definition threshold comprises:
detecting a working state of an electronic device responsive to that the image definition is lower than the definition threshold; and
acquiring the target infrared image and the RGB image obtained by capturing the same scene by the infrared camera and the RGB camera responsive to that the working state of the electronic device is a present working state.

2. The camera calibration method according to claim 1, wherein the preset working state comprises at least one of following conditions:
it is detected that a face for screen unlocking fails to match with a pre-stored face; it is
detected that the number of times of failure in matching a face for screen unlocking with a pre-stored face exceeds a first preset number of times;
an instruction for starting the infrared camera and the RGB camera is received;
it is detected that a difference between a current temperature and an initial temperature of a light emitter exceeds a temperature threshold;
it is detected that a difference between a current temperature and an initial temperature of a light emitter exceeds a temperature threshold for a second preset number of times successively; or,
a request for three-dimensional processing of a preview image is received.

3. The camera calibration method according to claim 1, wherein acquiring the target infrared image and the RGB image obtained by capturing the same scene by the infrared camera and the RUB camera responsive to that the working state of the electronic device is the preset working state comprises:
acquiring the target infrared image and the RGB image obtained by capturing the same scene by the infrared camera and the RGB camera responsive to that the working state of the electronic device is that a face for screen unlocking fails to match with a pre-stored face; and acquiring the target infrared image and the RGB image obtained by capturing the same scene by the infrared camera and the RGB camera when it is detected again that the working state of the electronic device is that an instruction for starting the infrared camera and the RGB camera is received.

4. The camera calibration method according to claim 3, wherein acquiring the target infrared image and the RGB image obtained by capturing the same scene by the infrared camera and the RGB camera responsive to that the working state of the electronic device is the preset working state further comprises:
acquiring the target infrared image and the RGB image obtained by capturing the same scene by the infrared camera and the RGB camera when it is detected again that the working state of the electronic device is that a difference between a current temperature and an initial temperature of a light emitter exceeds a temperature threshold.

5. The camera calibration method according to claim 3, wherein acquiring the target infrared image and the RGB image obtained by capturing the same scene by the infrared camera and the RGB camera in responsive to the working state of the electronic device is the preset working state further comprises:
acquiring the target infrared image and the RGB image obtained by capturing the same scene by the infrared camera and the RGB camera when it is detected again that the working state of the electronic device is that a difference between a current temperature and an initial temperature of a light emitter exceeds a temperature threshold for a second preset number of times successively.

6. The camera calibration method according to claim 3, wherein acquiring the target infrared image and the RGB image obtained by capturing the same scene by the infrared camera and the RGB camera responsive to that the working state of the electronic device is the preset working state further comprises:
acquiring the target infrared image and the RGB image obtained by capturing the same scene by the infrared camera and the RGB camera when it is detected again that the working state of the electronic device is that a request for three-dimensional processing of a preview image is received.

7. The camera calibration method according to claim 1, wherein extracting the feature points from the target infrared image to obtain the first feature point set, extracting the feature points from the RGB image to obtain the second feature point set, and matching the first feature point set with the second feature point set comprises:
extracting feature points equally spaced in the target infrared image to obtain the first feature point set, extracting feature points equally spaced in the RGB image to obtain the second feature point set, and matching the first feature point set with the second feature point set.

8. The camera calibration method according to claim 7, wherein the preset working state comprises at least one of following conditions:
an instruction for starting the infrared camera and the RGB camera is received;
it is detected that a face for screen unlocking fails to match with a pre-stored face; or
it is detected that the number of times of failure in matching a face for screen unlocking with a pre-stored face exceeds a first preset number of times.

9. The camera calibration method according to claim 7, wherein acquiring the target infrared image and the RGB image obtained by capturing the same scene by the infrared camera and the RGB camera responsive to that the working state of the electronic device is the preset working state comprises:
acquiring the target infrared image and the RGB image obtained by capturing the same scene by the infrared camera and the RGB camera responsive to that a face for screen unlocking fails to match with a pre-stored face; and
acquiring the target infrared image and the RGB image obtained by capturing the same scene by the infrared camera and the RGB camera in a case that an instruction for starting the infrared camera and the RGB camera is received.

10. The camera calibration method according to claim 7, further comprising:
acquiring the RGB image obtained by capturing the same scene by the RGB camera in a first operating environment, and acquiring the target infrared image obtained by capturing the same scene by the infrared camera in a second operating environment; and
extracting the feature points equally spaced in the target infrared image in the second operating environment to obtain the first feature point set, extracting the feature points equally spaced in the RGB image in the first operating environment to obtain the second feature point set, and matching the first feature point set with the second feature point set in the second operating environment, a security level of the second operating environment being higher than that of the first operating environment.

11. The camera calibration method according to claim 7, further comprising:
acquiring the RGB image obtained by capturing the same scene by the RGB
camera in a first operating environment, and acquiring the target infrared image obtained by capturing the same scene by the infrared camera in a second operating environment; and
transmitting the RGB image to the second operating environment, extracting the feature points equally spaced in the target infrared image in the second operating environment to obtain the first feature point set, extracting the feature points equally spaced in the RGB image to obtain the second feature point set, and matching the first feature point set with the second feature point set in the second operating environment, a security level of the second operating environment being higher than that of the first operating environment.

12. The camera calibration method according to claim 7, further comprising:
acquiring the RGB image obtained by capturing the same scene by the RGB camera in a first operating environment, and acquiring the target infrared image obtained by capturing the same scene by the infrared camera in a second operating environment;
extracting the feature points equally spaced in the target infrared image in the second operating environment to obtain the first feature point set, and transmitting the first feature point set to the first operating environment; and
extracting the feature points equally spaced in the RGB image in the first operating environment to obtain the second feature point set, and matching the first feature point set with the second feature point set in the first operating environment, a security level of the second operating environment being higher than that of the first operating environment.

13. An electronic device, comprising a memory and a processor, the memory configured to store a computer program, wherein the computer program, when executed by the processor, enables the processor to perform following steps of:
    acquiring a target infrared image and a Red/Green/Blue (RGB) image obtained by capturing a same scene by an infrared camera and an RGB camera responsive to that an image definition is lower than a definition threshold;
    extracting feature points from the target infrared image to obtain a first feature point set, extracting feature points from the RGB image to obtain a second feature point set, and matching the first feature point set with the second feature point set; and
    acquiring a transformation relation between a coordinate system of the infrared camera and a coordinate system of the RGB camera according to matched feature points,
    detecting a working state of the electronic device responsive to that the image definition is lower than the definition threshold; and
    acquiring the target infrared image and the RGB image obtained by capturing the same scene by the infrared camera and the RGB camera responsive to that the working state of the electronic device is a preset working state.

14. The electronic device according to claim 13, wherein the computer program, when executed by the processor, enables the processor to further perform following steps of:
    acquiring the target infrared image and the RGB image obtained by capturing the same scene by the infrared camera and the RGB camera responsive to that the working state of the electronic device is that a face for screen unlocking fails to match with a pre-stored face; and
    acquiring the target infrared image and the RGB image obtained by capturing the same scene by the infrared camera and the RGB camera when it is detected again that the working state of the electronic device is that an instruction for starting the infrared camera and the RGB camera is received.

15. The electronic device according to claim 14, wherein the computer program, when executed by the processor, enables the processor to further perform following steps of:
    acquiring the target infrared image and the RGB image obtained by capturing the same scene by the infrared camera and the RGB camera when it is detected again that the working state of the electronic device is that a difference between a current temperature and an initial temperature of a light emitter exceeds a temperature threshold.

16. The electronic device according to claim 14, wherein the computer program, when executed by the processor, enables the processor to further perform following steps of:
    acquiring the target infrared image and the RGB image obtained by capturing the same scene by the infrared camera and the RGB camera when it is detected again that the working state of the electronic device is that a difference between a current temperature and an initial temperature of a light emitter exceeds a temperature threshold for a second preset number of times successively.

17. A non-transitory non-volatile computer-readable storage medium, having a computer program stored thereon, wherein the computer program is executable by a processor to implement following steps of:
    acquiring a target infrared image and a Red/Green/Blue (RGB) image obtained by capturing a same scene by an infrared camera and an RGB camera responsive to that an image definition is lower than a definition threshold;
    extracting feature points from the target infrared image to obtain a first feature point set, extracting feature points from the RGB image to obtain a second feature point set, and matching the first feature point set with the second feature point set; and
    acquiring a transformation relation between a coordinate system of the infrared camera and a coordinate system of the RGB camera according to matched feature points,
    wherein acquiring the target infrared image and the RGB image obtained by capturing the same scene by the infrared camera and the RGB camera responsive to that the image definition is lower than the definition threshold comprises:
    detecting a working state of an electronic device responsive to that the image definition is lower than the definition threshold; and
    acquiring the target infrared image and the RGB image obtained by capturing the same scene by the infrared camera and the RGB camera responsive to that the working state of the electronic device is a preset working state.

* * * * *